(12) United States Patent
Nakahara et al.

(10) Patent No.: US 8,255,002 B2
(45) Date of Patent: Aug. 28, 2012

(54) MOBILE INFORMATION TERMINAL AND CELLULAR PHONE

(75) Inventors: Yasutomo Nakahara, Osaka (JP); Kiyoshi Suzuki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 368 days.

(21) Appl. No.: 12/530,965

(22) PCT Filed: Apr. 2, 2008

(86) PCT No.: PCT/JP2008/056568
§ 371 (c)(1),
(2), (4) Date: Sep. 11, 2009

(87) PCT Pub. No.: WO2008/123546
PCT Pub. Date: Oct. 16, 2008

(65) Prior Publication Data
US 2010/0291973 A1 Nov. 18, 2010

(30) Foreign Application Priority Data

Apr. 3, 2007 (JP) ................................ 2007-097160
Apr. 3, 2007 (JP) ................................ 2007-097161

(51) Int. Cl.
*H04M 1/00* (2006.01)
(52) U.S. Cl. ........ 455/566; 345/173; 345/156; 345/905; 345/166; 345/169; 178/18.01; 178/19.01; 178/18.03; 178/18.05
(58) Field of Classification Search ................. 345/157, 345/173, 169, 156, 174; 361/288, 681
See application file for complete search history.

(56) References Cited

U.S. PATENT DOCUMENTS 5,481,278 A   1/1996   Shigematsu et al.
5,617,117 A * 4/1997   Kataoka et al. ............... 345/157
(Continued)

FOREIGN PATENT DOCUMENTS

JP   6-131110 A   5/1994
(Continued)

*Primary Examiner* — Rafael Pérez-Gutiérrez
*Assistant Examiner* — Joseph Arévalo
(74) *Attorney, Agent, or Firm* — Birch, Stewart, Kolasch & Birch, LLP

(57) ABSTRACT

A mobile information terminal has: an operating position detecting part 37 that detects an operating position of a user on the basis of an output of an electrostatic capacitance sensor 30 that includes a thin film having a plurality of electrodes and detects an electrostatic capacitance of each of the electrodes; a direction input control part 31 that senses movement of the operating position on the basis of an output of the operating position detecting part, and generates a direction input signal; a key input part 32 that detects a pressing operation of the user on a pressing face of an operation key, and generates a key input signal; a display 22 having a display screen; and a display control part 34 that controls a display position of image information in the display screen on the basis of the direction input signal. A part of the thin film of the electrostatic capacitance sensor 30 is formed with overlapping with at least a part of the pressing face of the operation key, and upon sensing of the movement of the operating position, the direction input control part 31 determines whether or not to generate the direction input signal on the basis of an operating position upon start of the movement. Upon operation of the operation key that is arranged with overlapping with an electrostatic pad, a direction input for moving a screen display can be suppressed from being erroneously provided.

6 Claims, 18 Drawing Sheets

U.S. PATENT DOCUMENTS

| | | | |
|---|---|---|---|
| 6,215,476 B1* | 4/2001 | Depew et al. | 345/173 |
| 7,821,506 B2* | 10/2010 | Sato et al. | 345/174 |
| 7,952,563 B2* | 5/2011 | Park et al. | 345/173 |
| 2002/0064018 A1* | 5/2002 | Suzuki | 361/288 |
| 2003/0025679 A1 | 2/2003 | Taylor et al. | |
| 2005/0099400 A1* | 5/2005 | Lee | 345/173 |
| 2006/0034042 A1* | 2/2006 | Hisano et al. | 361/681 |
| 2006/0038789 A1* | 2/2006 | Ban et al. | 345/169 |
| 2006/0250354 A1* | 11/2006 | Takata et al. | 345/156 |
| 2007/0063987 A1* | 3/2007 | Sato et al. | 345/173 |
| 2007/0132724 A1* | 6/2007 | Muranaka | 345/156 |

FOREIGN PATENT DOCUMENTS

| | | |
|---|---|---|
| JP | 2002-9907 A | 1/2002 |
| JP | 2004-535712 A | 11/2004 |

\* cited by examiner

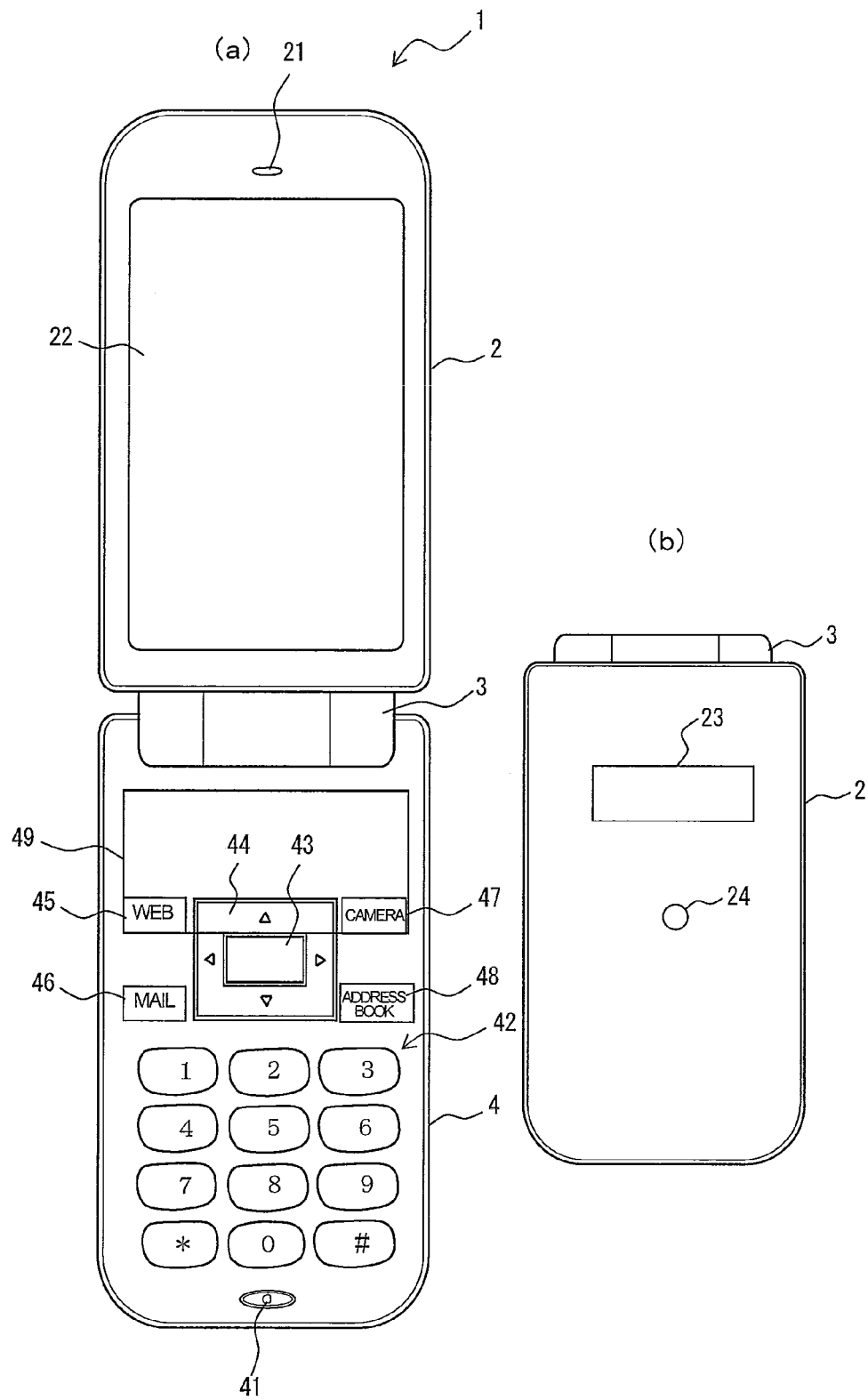

[Fig. 2]
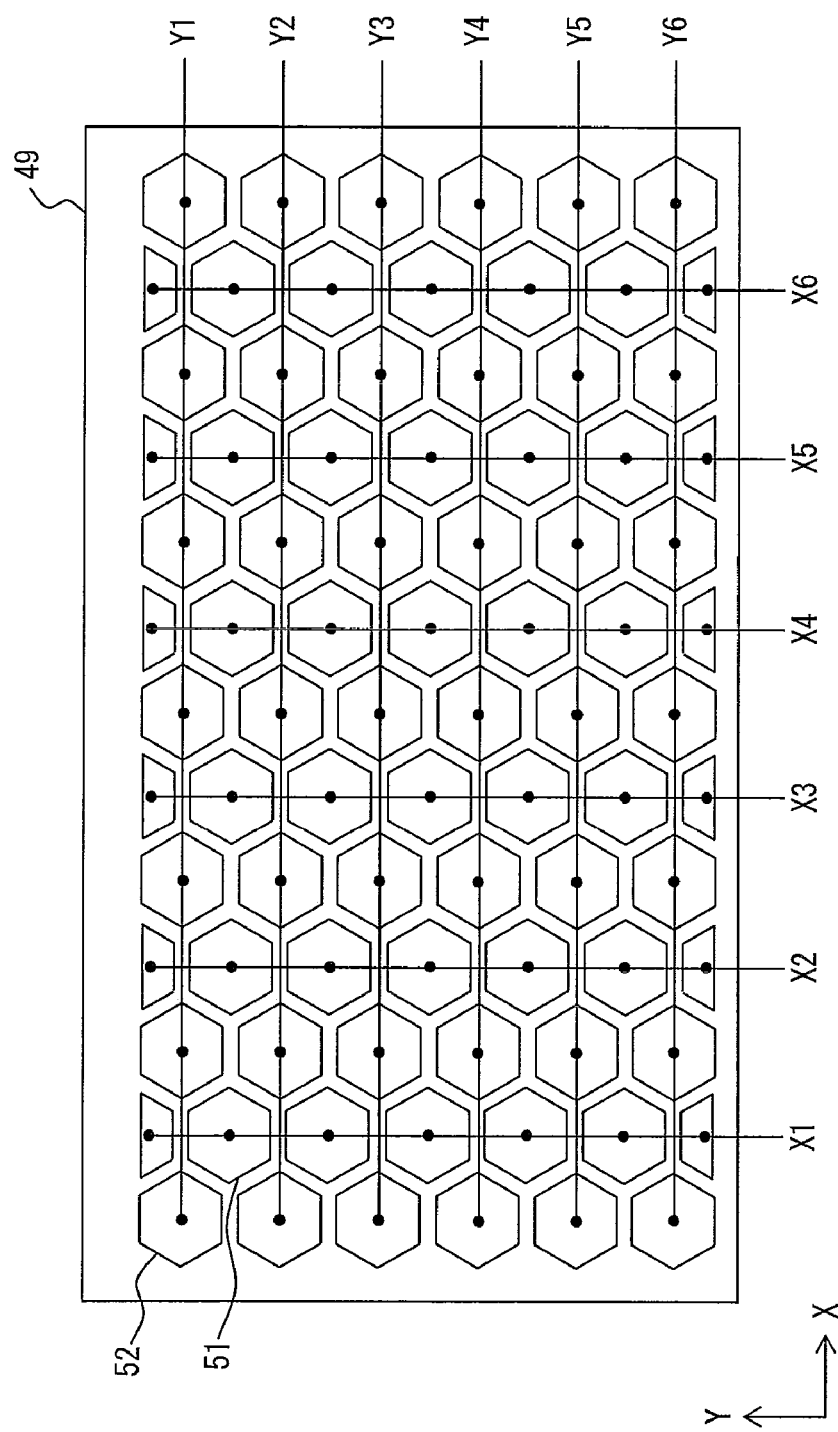

[Fig. 3]
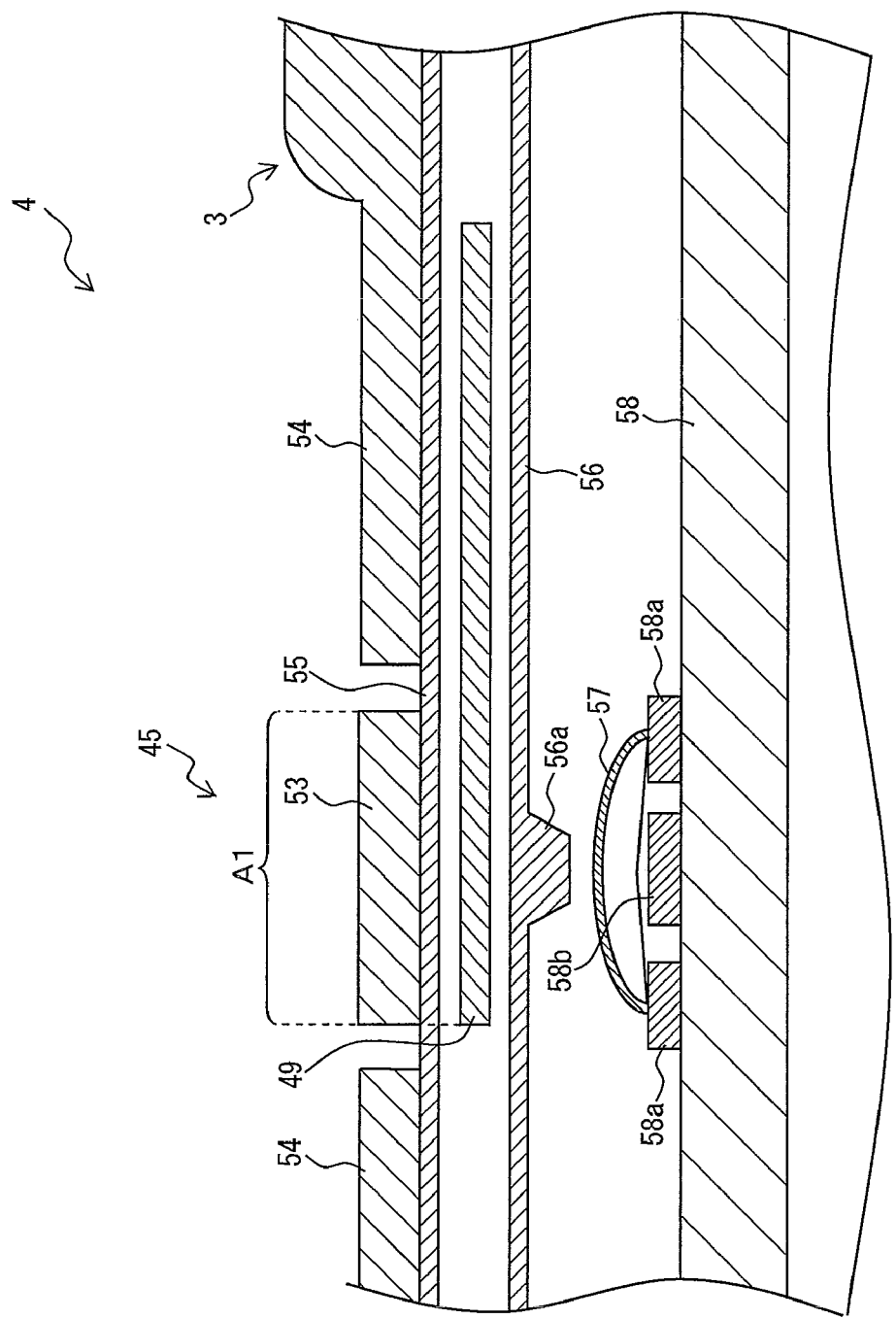

[Fig.4]
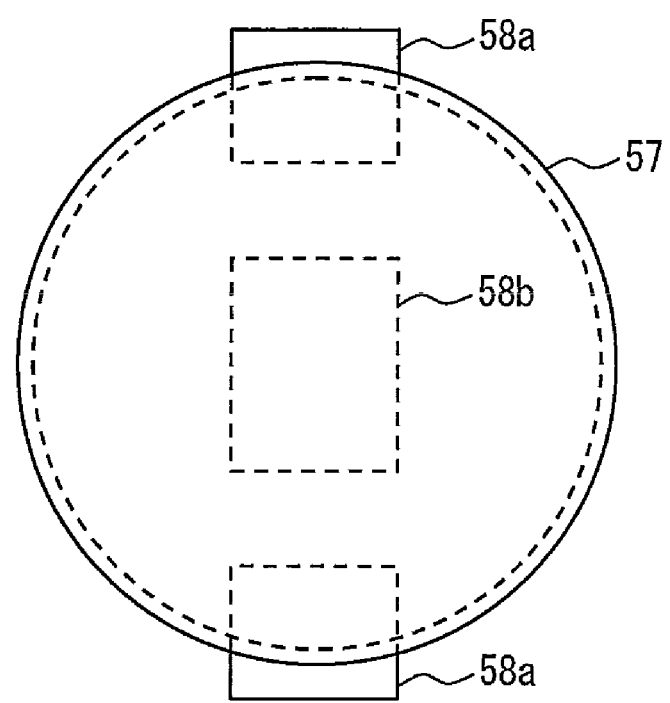

[Fig.5]
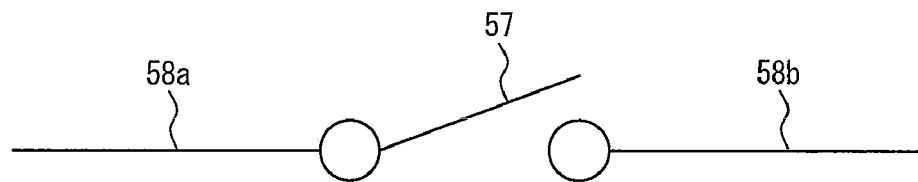

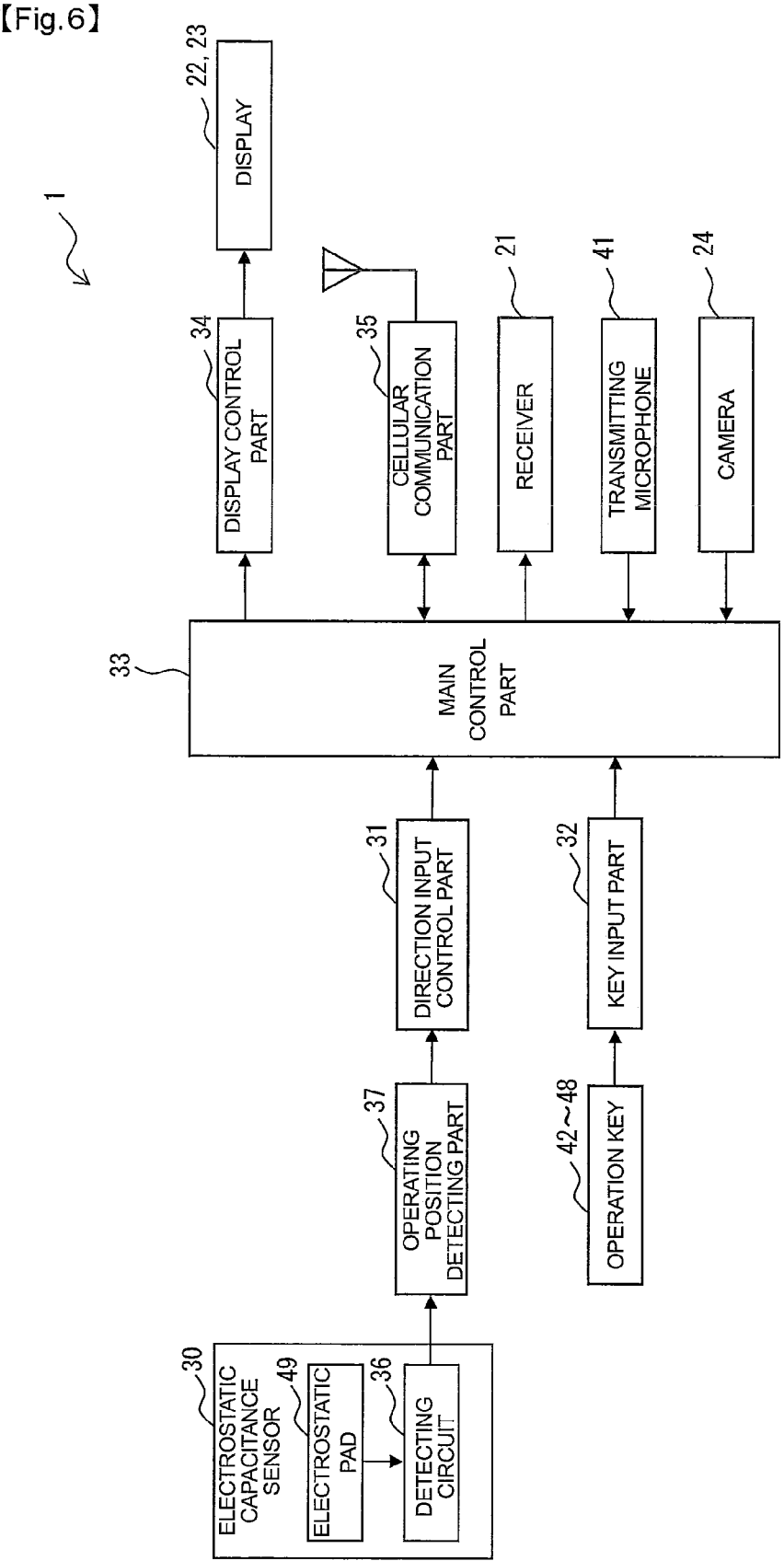

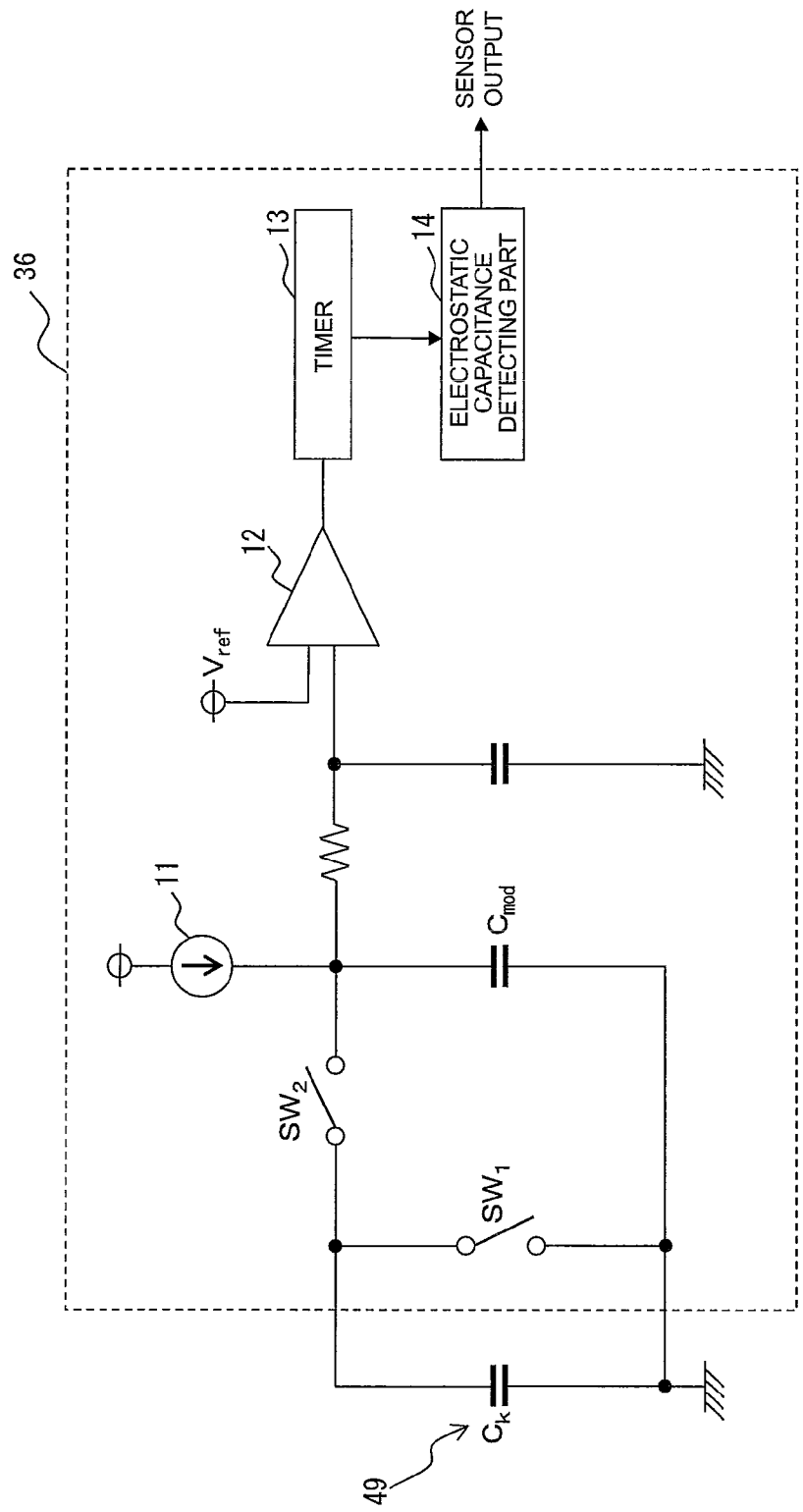
[Fig. 7]

[Fig.8]
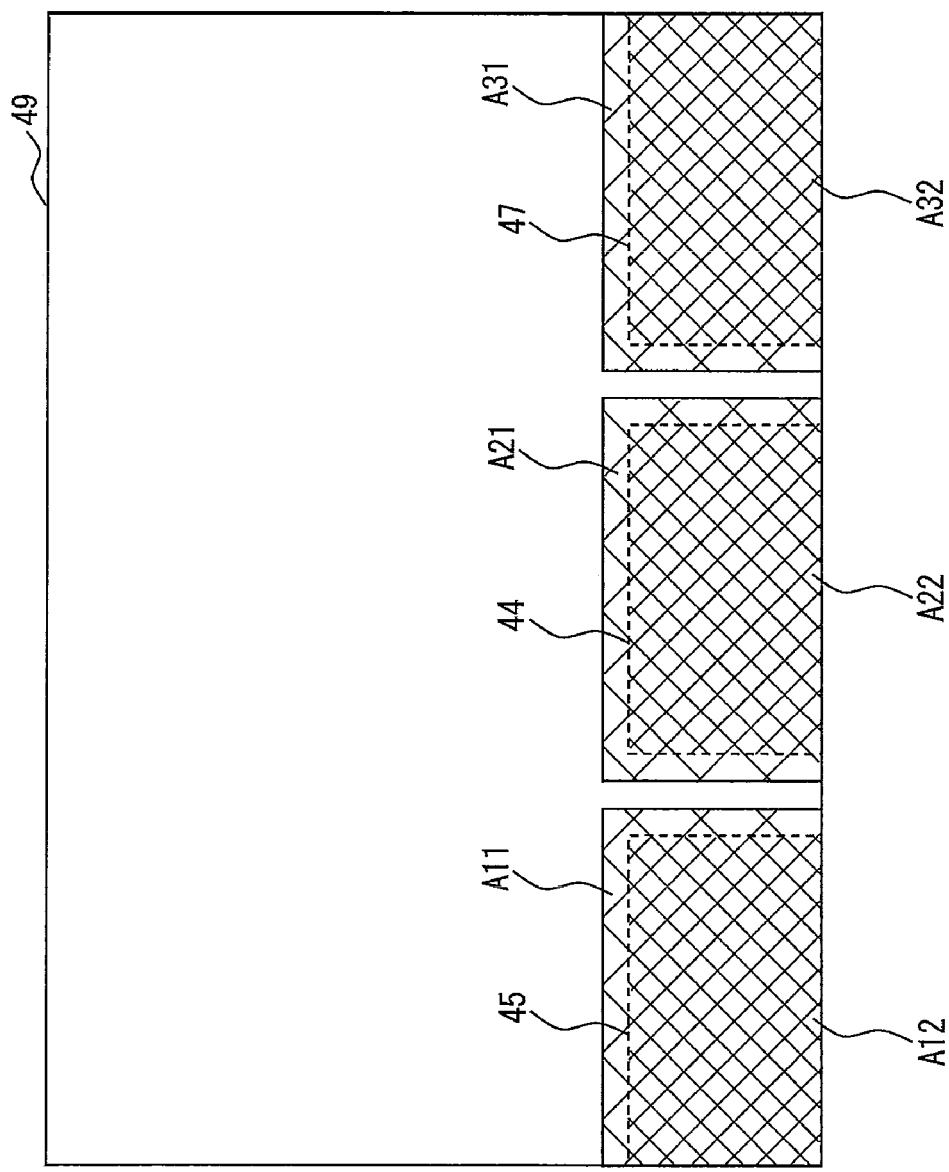

[Fig.9]
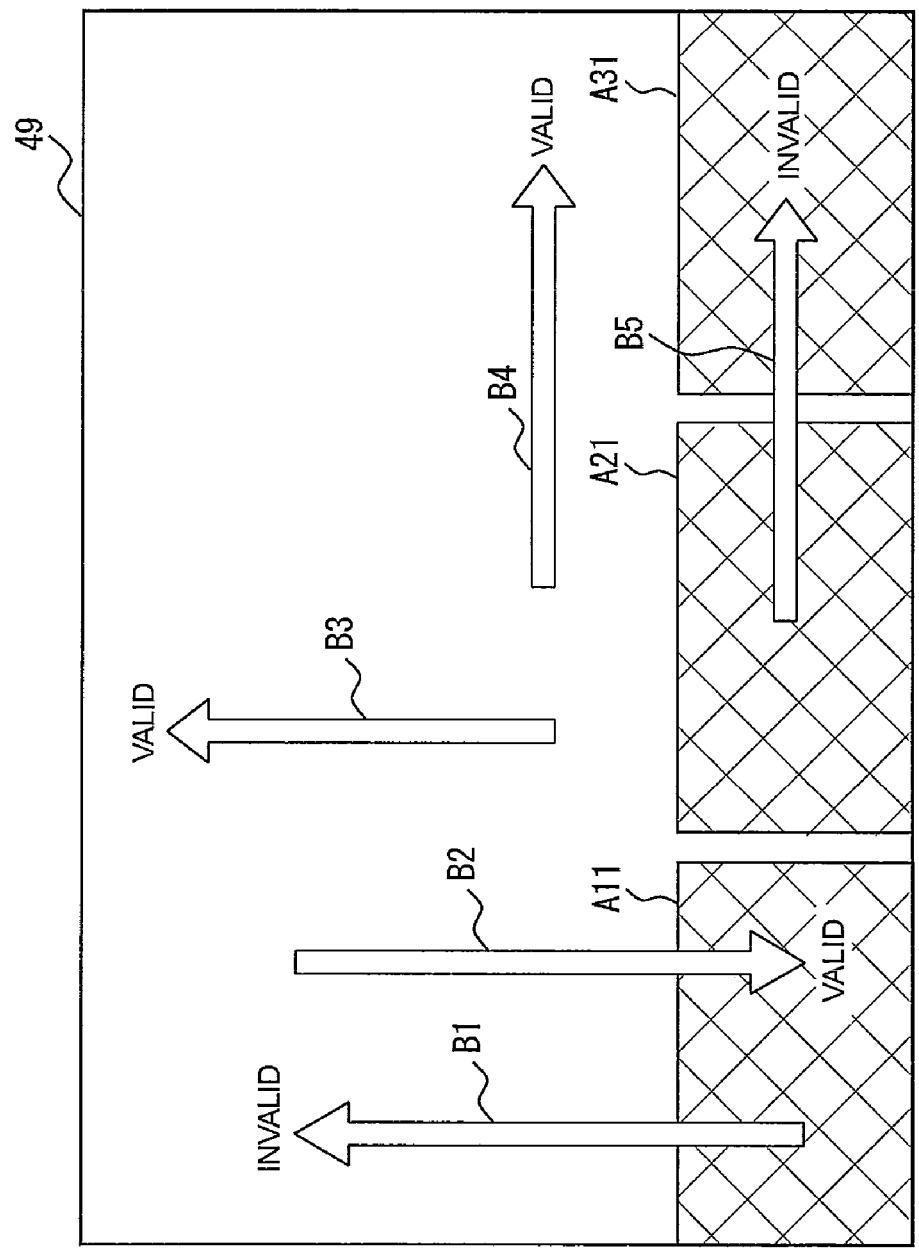

[Fig.10]
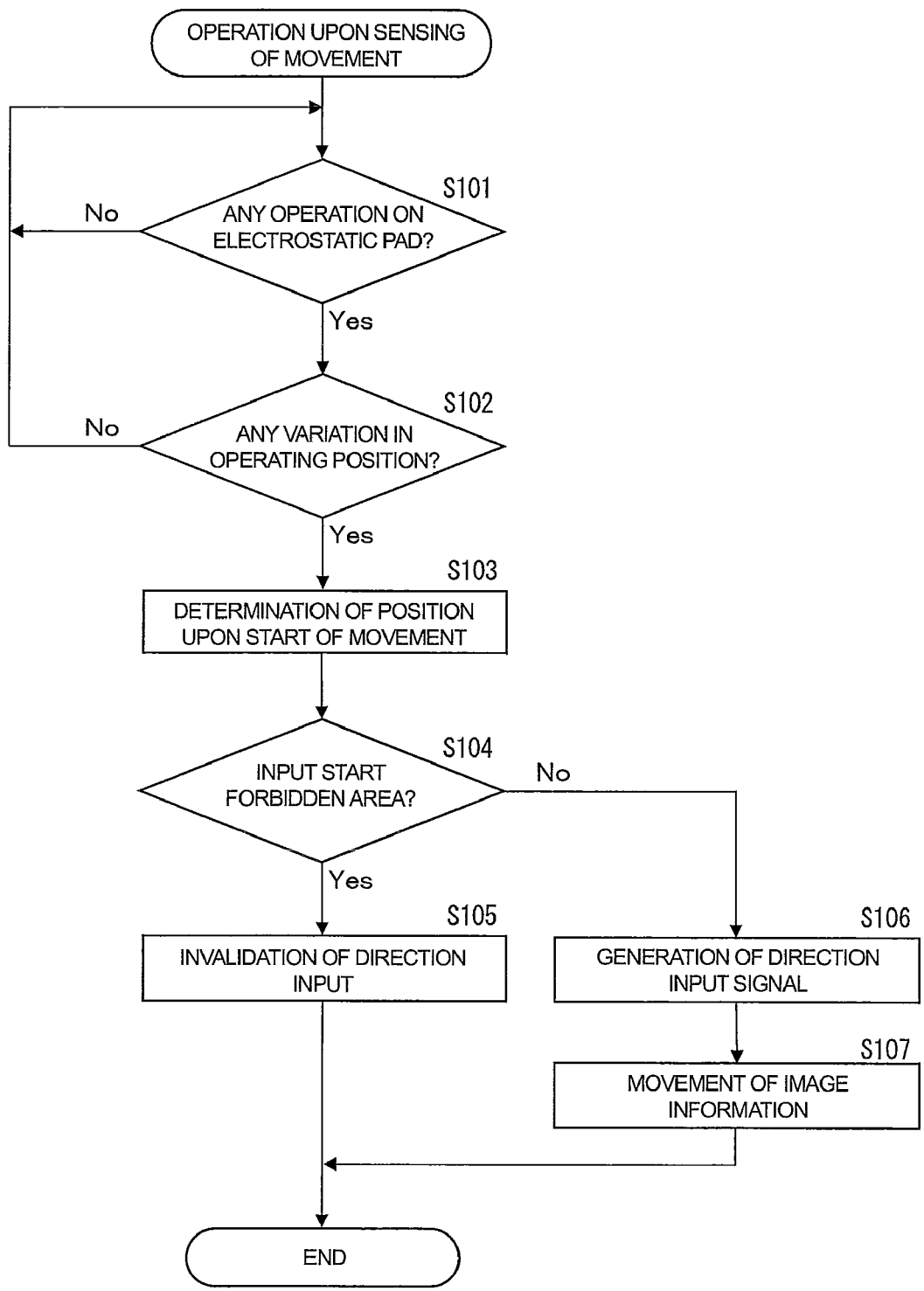

[Fig.11]
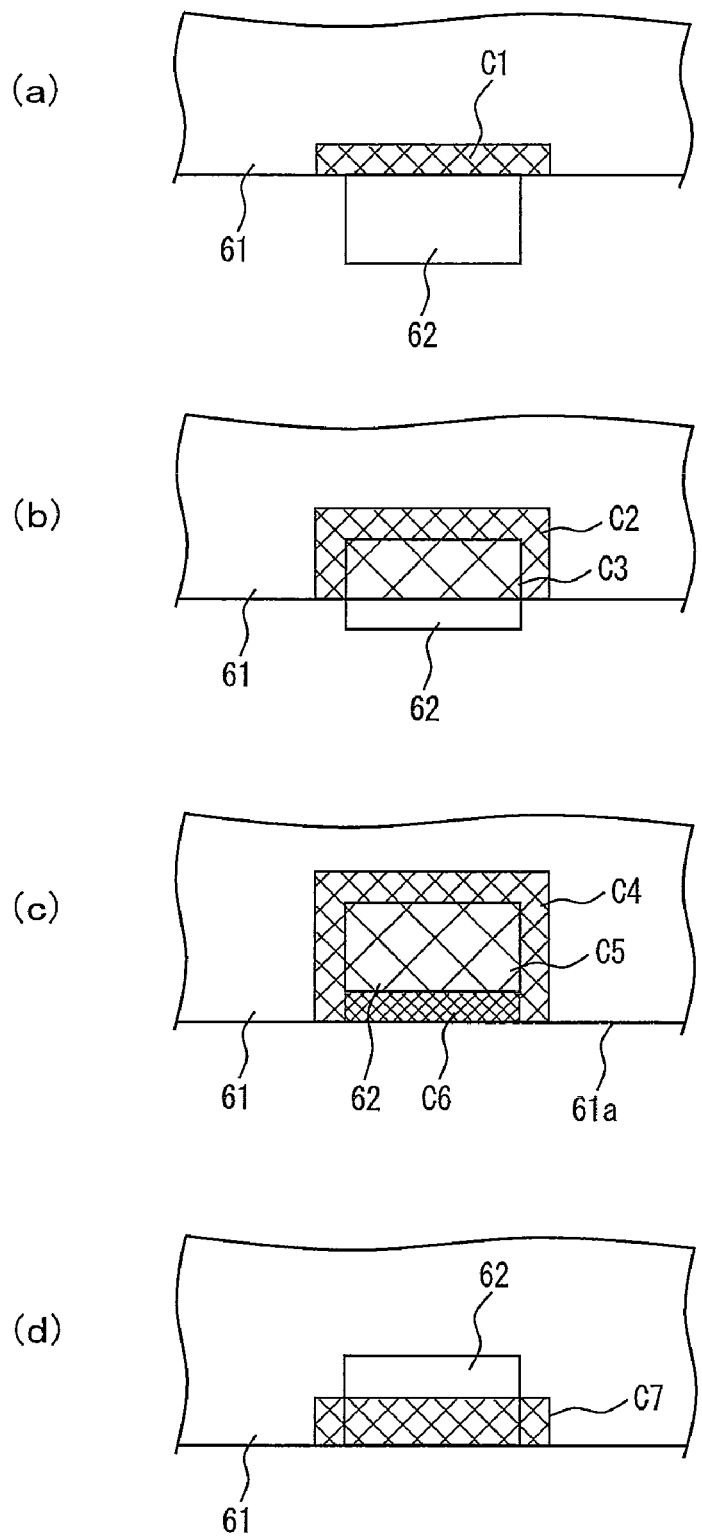

[Fig.12]
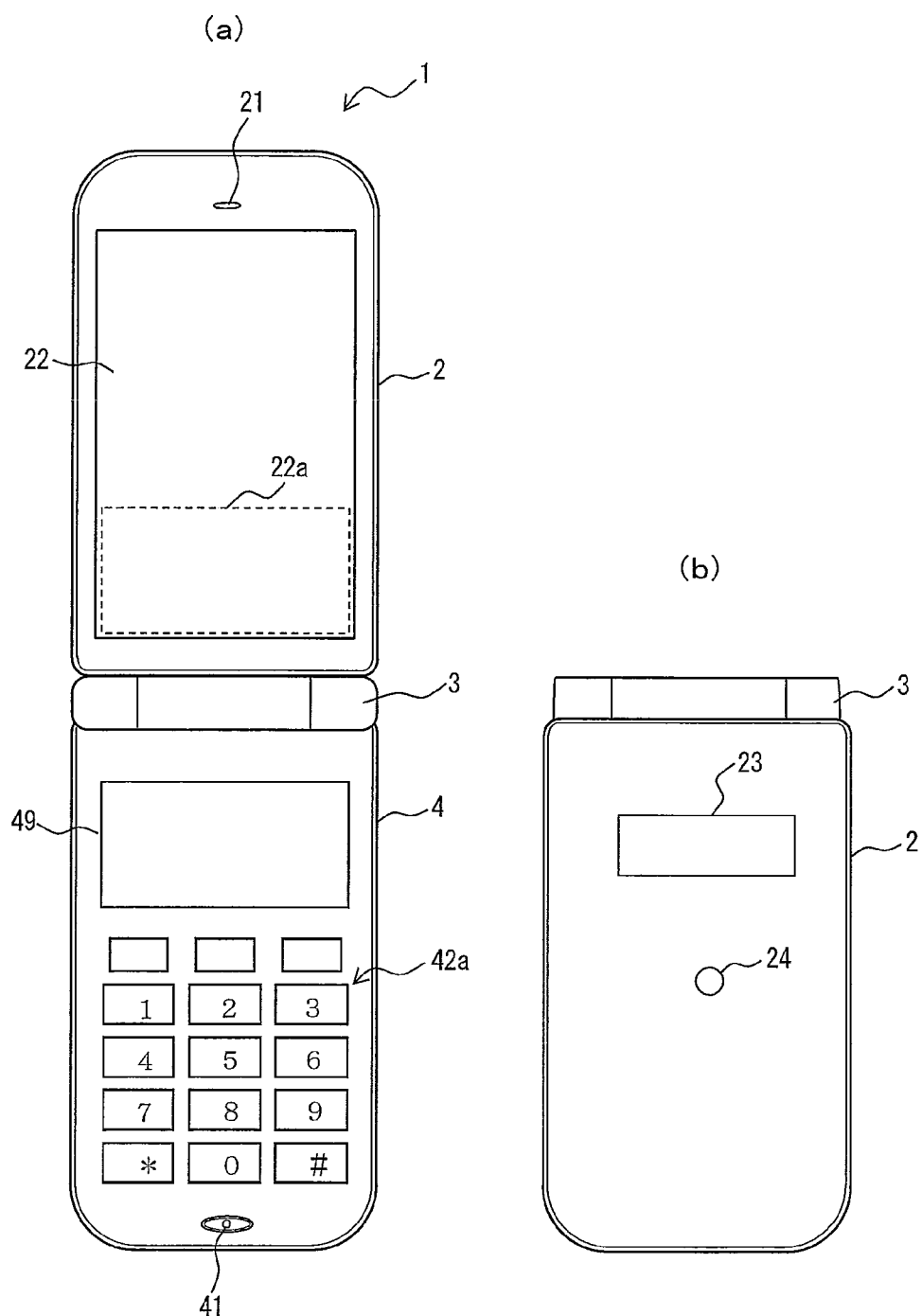

[Fig. 13]
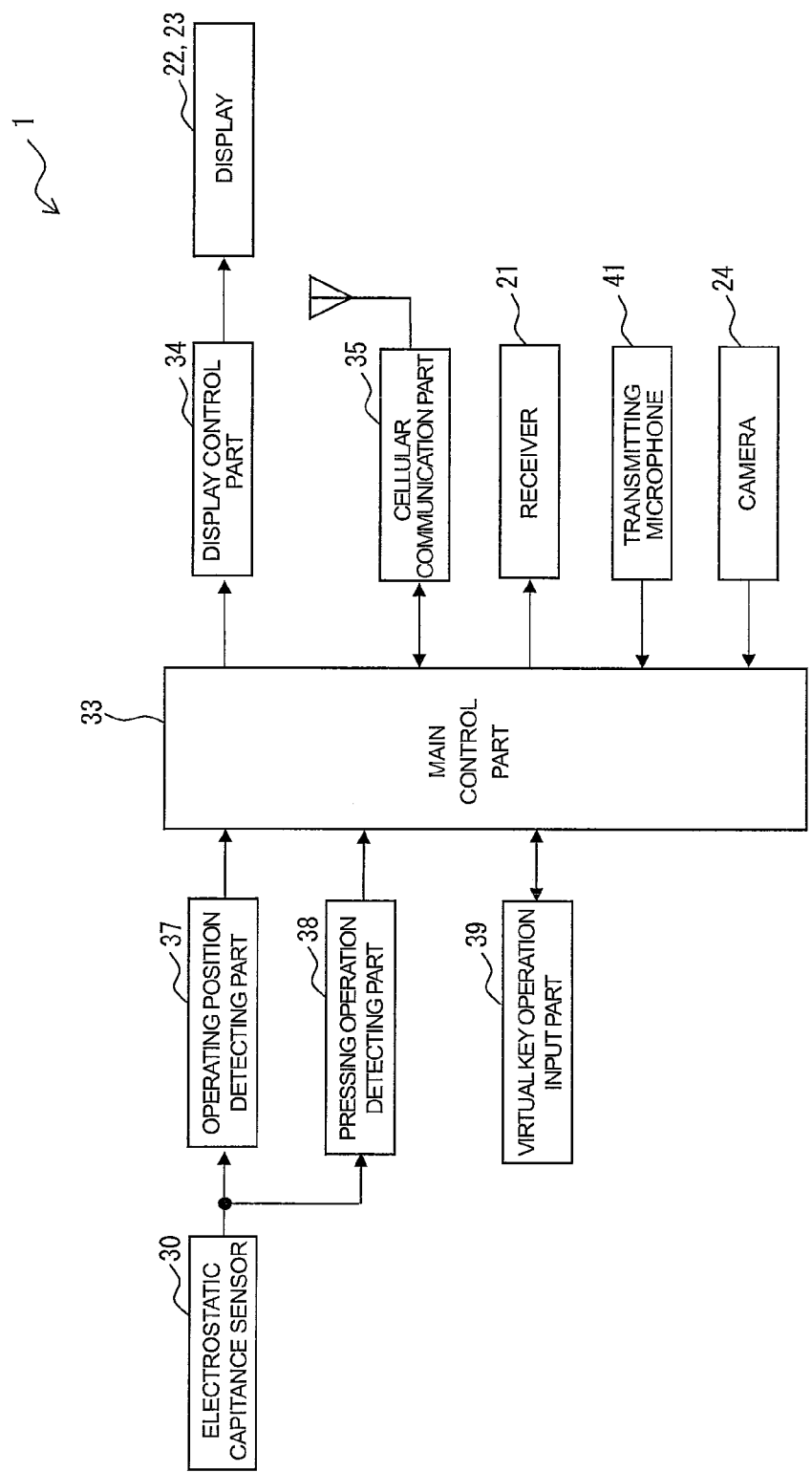

[Fig.14]
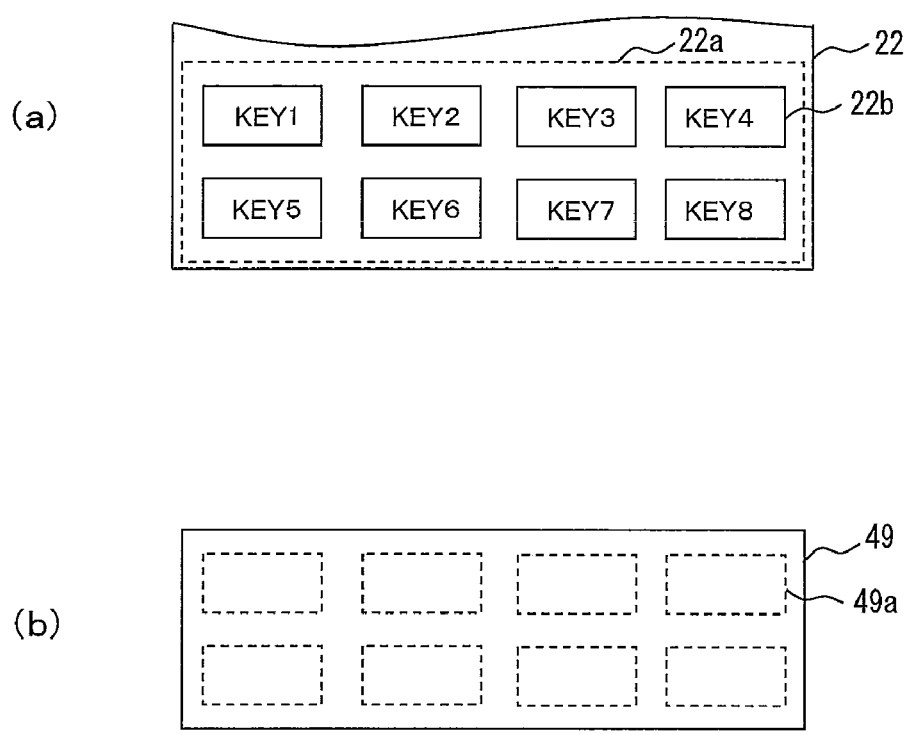

【Fig.15】
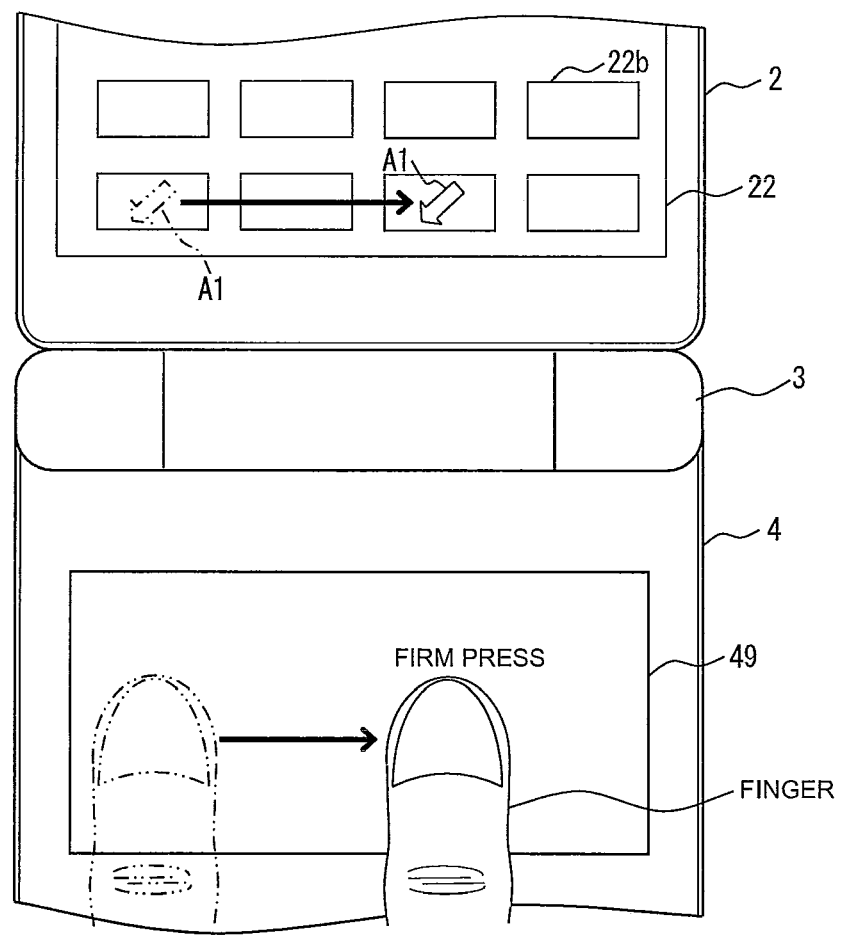

[Fig. 16]
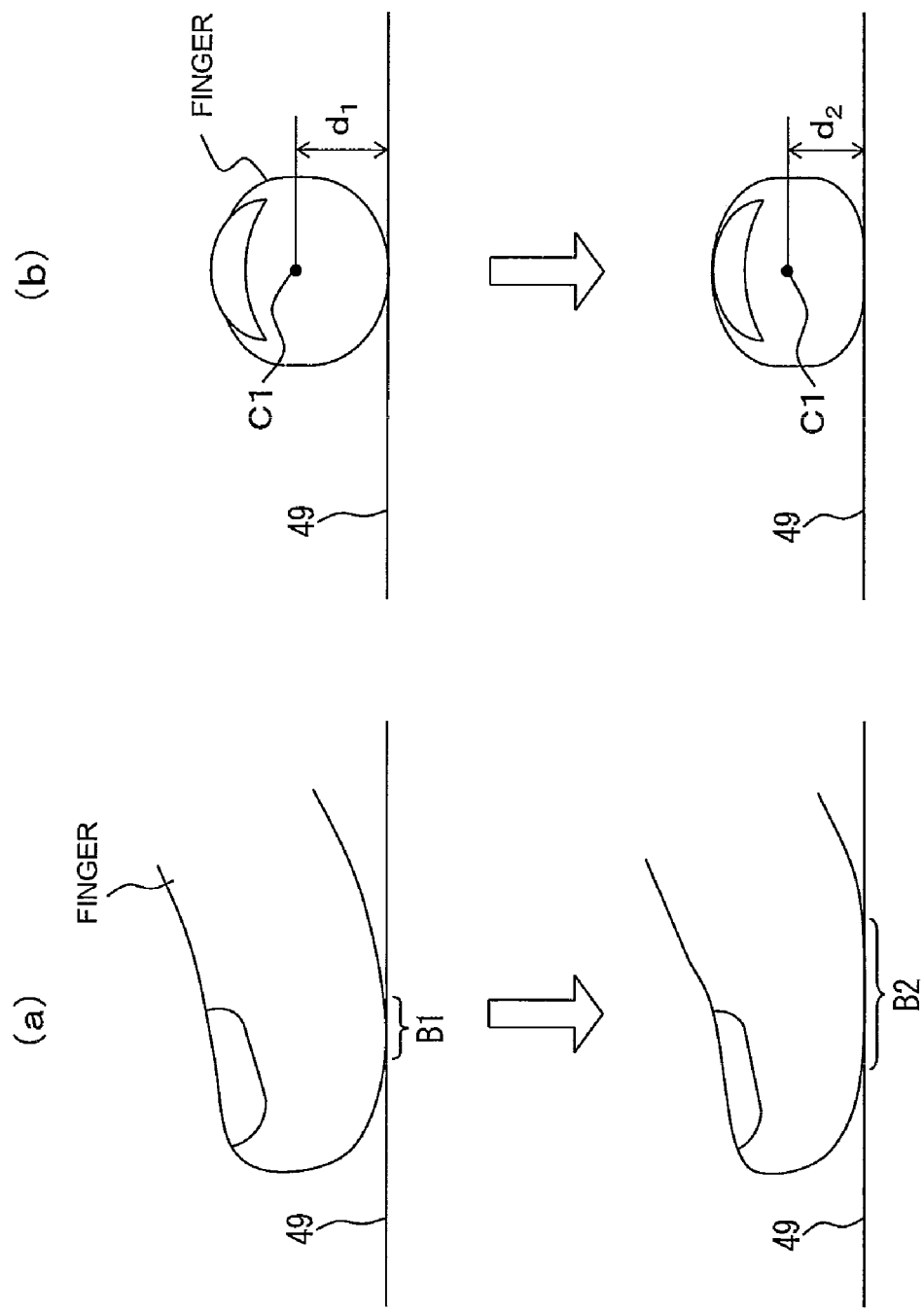

【Fig.17】
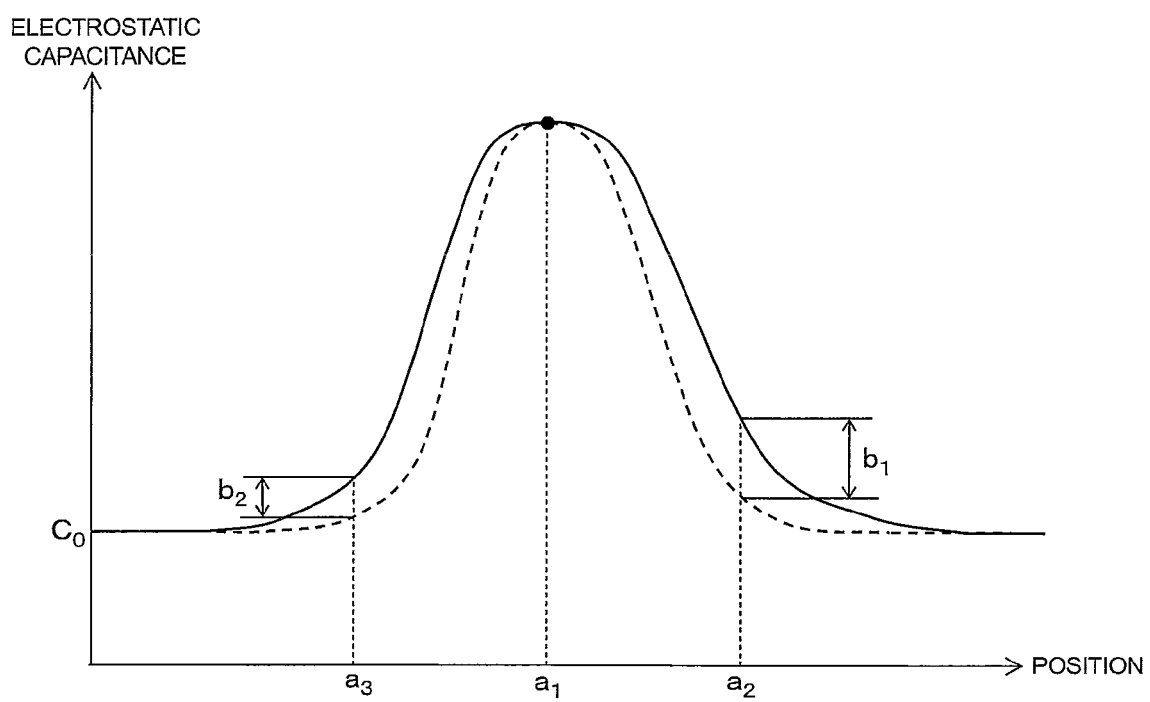

[Fig.18]
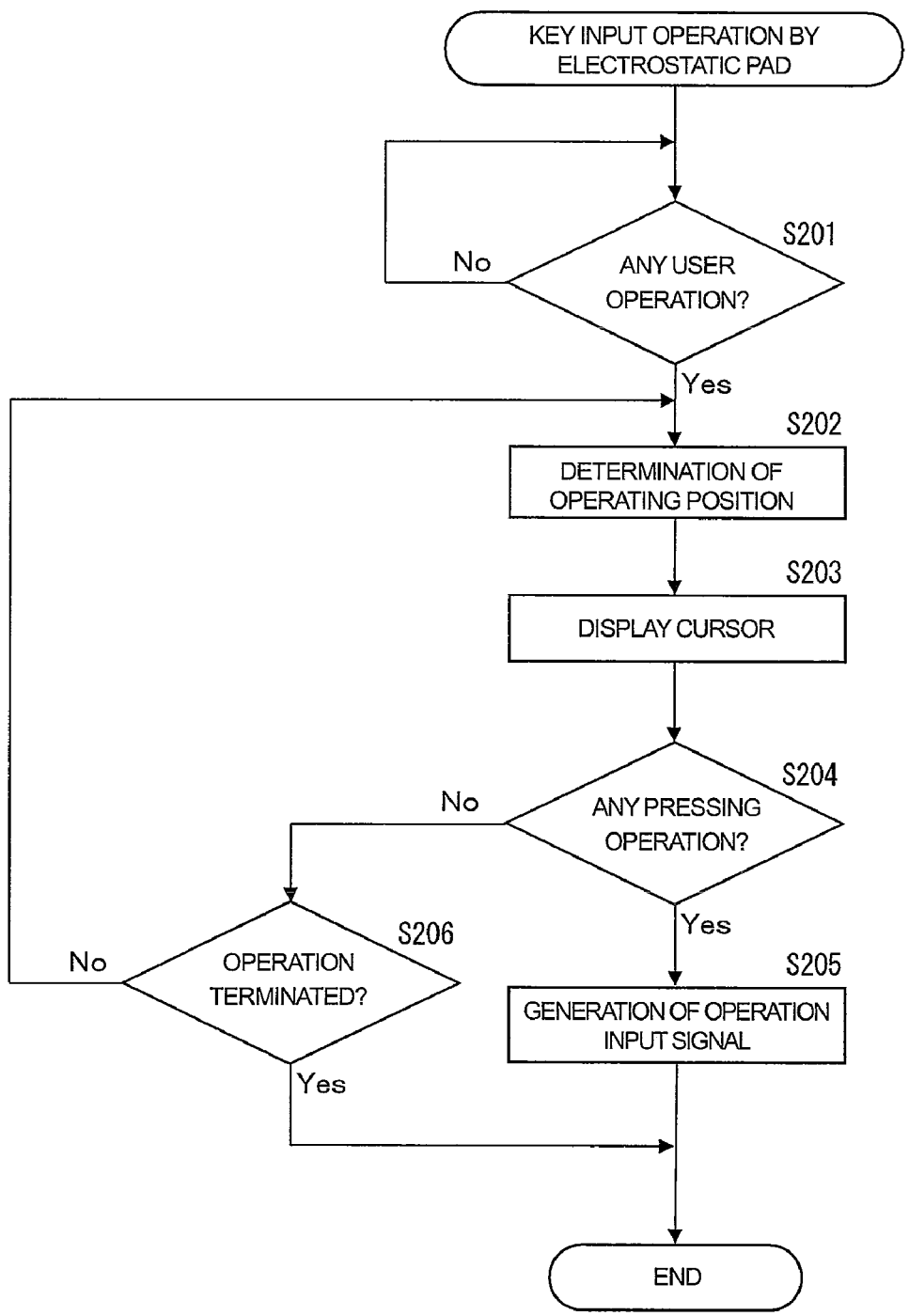

MOBILE INFORMATION TERMINAL AND CELLULAR PHONE

TECHNICAL FIELD

The present invention relates to a mobile information terminal and a cellular phone, and more particularly, to improvement of a mobile information terminal provided with a sensor that detects an operating position with use of a phenomenon in which an electrostatic capacitance of an electrode is varied by a user operation.

BACKGROUND ART

As a sensor capable of detecting a user operation to determine a corresponding operating position with use of a phenomenon in which an electrostatic capacitance of an electrode is varied by the user operation, an electrostatic capacitance type touch pad (hereinafter referred to as an electrostatic pad) is known. The electrostatic pad is a pointing device by which input depending on an operating position is provided, and used for scrolling a screen display and movement of a cursor. The scrolling of a screen display and movement of a cursor are performed by sensing movement of the operating position, and if the electrostatic pad is traced with a finger, a corresponding moving direction is inputted. Such electrostatic pad is easily formed into a thin shape and excellent in durability, as compared with operation keys each including a contact switching type switch in which electrical conduction is made between terminals by pressing, and has therefore conventionally been used in a mobile information terminal as an input device.

In general, a mobile information terminal such as a cellular phone or PDA (Personal Digital Assistants) is required to be portable, and therefore miniaturized. On the other hand, the miniaturization of the electrostatic pad or operation keys in size without reducing operability has a limitation. For this reason, in the mobile information terminal, if the electrostatic pad and the operation keys are attempted to be both arranged, the electrostatic pad and operation keys may be often adjacently arranged, or the electrostatic pad may be often arranged with overlapping with a part of the operation keys. In particular, in the cellular phone often operated with a casing being held by one hand, from the perspective of better operability upon operation by one hand, the electrostatic pad and the operation keys may be often adjacently arranged.

DISCLOSURE OF THE INVENTION

Problem to be Solved by the Invention

In the conventional mobile information terminal as described above, there is a problem that when the operation keys arranged adjacent to or with overlapping with the electrostatic pad are operated, the electrostatic pad is traced, and therefore a direction input for scrolling a screen display or moving a cursor is erroneously provided.

The present invention is made in consideration of the above situation, and has an object to provide a mobile information terminal and a cellular phone in which an erroneous operation upon operation of operation keys arranged adjacent to, or with overlapping with an electrostatic pad is suppressed to improve operability. In particular, the present invention has an object to provide a mobile information terminal that suppresses erroneous provision of the direction input for scrolling the screen display or moving the cursor.

Means Adapted to Solve Problems

A mobile information terminal according to a first aspect of the present invention is configured to include: an electrostatic capacitance sensor that includes a thin film arranged with a plurality of electrodes, and detects an electrostatic capacitance of each of the electrodes; operating position detecting means that detects an operating position of a user on a basis of an output of the electrostatic capacitance sensor; direction input control means that, on a basis of an output of the operating position detecting means, senses movement of the operating position and generates a direction input signal indicating a direction of the movement; key input means that detects a pressing operation of the user on a pressing face, and generates a key input signal; display means that has a display screen for displaying image information; and display control means that, on a basis of the direction input signal, controls a display position of the image information in the display screen, wherein a part of the thin film of the electrostatic capacitance sensor is formed with overlapping with at least a part of the pressing face of the key input means, and the direction input control means determines, upon sensing of the movement of the operating position, whether or not to generate the direction input signal, on a basis of an operating position upon start of the movement.

In the mobile information terminal, the part of the thin film of the electrostatic capacitance sensor is formed with overlapping with the pressing face of the key input means, and upon sensing of the movement of the operating position, it is determined whether or not to generate the direction input signal on the basis of the operating position upon start of the movement. Based on such a configuration, the direction input signal is appropriately generated depending on the operating position upon start of the movement, and therefore upon operation of the operation key arranged with overlapping with the thin film of the electrostatic capacitance sensor, a direction input for controlling the display position of the image information can be suppressed form being erroneously provided.

A mobile information terminal according to a second aspect of the present invention is, in addition to the above configuration, configured such that the direction input control means generates the direction input signal in the case where the operating position upon start of the movement is outside an input start forbidden area formed on the thin film in relation to the pressing face, and does not generate the direction input signal when the operating position is inside the input start forbidden area. According to such a configuration, by defining the input start forbidden area as an area where direction input is desirably forbidden, the direction input signal is appropriately generated depending on whether or not the operating position upon start of the movement is inside the input start forbidden area, and therefore unintended direction input can be prevented from being provided.

A mobile information terminal according to a third aspect of the present invention is, in addition to the above configuration, configured such that the input start forbidden area includes an overlapping area between the pressing face and the thin film. According to such a configuration, the input start forbidden area includes the overlapping area between the pressing face and the thin film, and therefore a direction input of which the operating position upon start of the movement is at least inside the overlapping area can be forbidden.

A mobile information terminal according to a fourth aspect of the present invention is, in addition to the above configuration, configured such that the input start forbidden area includes an area sandwiched between an edge side of the thin film and the overlapping area, the edge side being closest to the overlapping area. According to such a configuration, the input start forbidden area includes the overlapping area between the pressing face and the thin film, and the area sandwiched between the edge side of the thin film and the overlapping area, and therefore upon operation of the operation key that is arranged overlapping with the thin film of the electrostatic capacitance sensor, an unintended direction input can be effectively prevented from being provided.

A mobile information terminal according to a fifth aspect of the present invention is, in addition to the above configuration, configured such that the pressing face of the key input means is arranged below a middle of the thin film, and the direction input control means senses vertical movement of the operating position to generate a direction input signal indicating any of an upper direction and a lower direction, and upon sensing upward movement of which the operating position upon start of the movement is inside the input start forbidden area, forbids upward movement of the image information. According to such a configuration, upon sensing of the upward movement of which the operating position upon start of the movement is inside the input start forbidden area, the upward movement of the image information is forbidden, and therefore upon operation of the operation key that is arranged below the middle of the thin film of the electrostatic capacitance sensor overlapping with the thin film, the unintended direction input can be effectively prevented from being provided.

A mobile information terminal according to a sixth aspect of the present invention is configured to include: an electrostatic capacitance sensor that includes a thin film arranged with a plurality of electrodes, and detects an electrostatic capacitance of each of the electrodes; operating position detecting means that detects an operating position of a user on a basis of an output of the electrostatic capacitance sensor; direction input control means that, on a basis of an output of the operating position detecting means, senses movement of the operating position, and generates a direction input signal indicating a direction of the movement; key input means that detects a pressing operation of the user on a pressing face, and generates a key input signal; display means that has and a display screen for displaying image information; and display control means that, on a basis of the direction input signal, controls a display position of the image information in the display screen, wherein the pressing face of the key input means is arranged adjacent to the thin film of the electrostatic capacitance sensor, and the direction input control means determines, upon sensing of movement of the operating position, whether or not to generate the direction input signal, on a basis of an operating position upon start of the movement.

In the mobile information terminal, the pressing face of the key input means is arranged adjacent to the thin film of the electrostatic capacitance sensor, and upon sensing of the movement of the operating position, it is determined whether or not to generate the direction input signal, on the basis of the operating position upon start of the movement. Based on such a configuration, the direction input signal is appropriately generated depending on the operating position upon start of the movement, and therefore, upon operation of the operation key arranged adjacent to the thin film of the electrostatic capacitance sensor, a direction input for controlling a display position of the image information can be suppressed from being erroneously provided.

A mobile information terminal according to a seventh aspect of the present invention is, in addition to the above configuration, configured such that the direction input control means generates the direction input signal in the case where the operating position upon start of the movement is outside an input start forbidden area on the thin film adjacent to the pressing face, and when the operating position is inside the input start forbidden area, does not generate the direction input signal. According to such a configuration, by defining the input start forbidden area as an area where a direction input is desirably forbidden, the direction input signal is appropriately generated depending on whether or not the operating position upon start of the movement is inside the input start forbidden area, and therefore an unintended direction input can be prevented from being provided.

An cellular phone according to an eighth aspect of the present invention is configured to include: a display screen for displaying image information; an operation key having a pressing face; an electrostatic pad that is provided between the display screen and the operation key, includes a thin film arranged with a plurality of electrodes, and detects an operating position of a user on the thin film on a basis of variations of electrostatic capacitances of the electrodes; direction input control means that senses movement of the operating position on a basis of a result of the detection by the electrostatic pad, and generates a direction input signal indicating a direction of the movement; key input means that detects a pressing operation of the user on the pressing face, and generates a key input signal; and display control means that displays the image information in the display screen on a basis of the direction input signal, wherein a part of the thin film of the electrostatic pad is formed with overlapping with at least a part of the pressing face of the operation key, and the direction input control means forbids, upon sensing of the movement of the operating position, upward movement of the image information on a basis of an operating position upon start of the movement.

Effect of the Invention

According to the mobile information terminal and the cellular phone based on the present invention, a direction input signal is appropriately generated depending on an operating position upon start of movement, and therefore erroneous provision of a direction input for controlling a display position of image information can be suppressed. Accordingly, an erroneous operation in the direction input for scrolling a screen display or movement of a cursor is suppressed, and therefore operability upon operation of an operation key that is arranged adjacent to or overlapping with an electrostatic pad can be improved.

BEST MODE FOR CARRYING OUT THE INVENTION

First Embodiment

FIGS. 1 (a) and (b) are appearance diagrams illustrating an example of a schematic configuration of a mobile information terminal according to a first embodiment of the present invention, in which a flip type cellular phone 1 is illustrated as an example of the mobile information terminal. The cellular phone 1 of which a display casing 2 and an operation casing 4 are connected to each other through a hinge part 3 can be folded with one face of the display casing 2 and that of the operation casing 4 facing to each other.

FIG. 1 (a) illustrates an appearance as viewed from an operation face side with both of the casings being expanded, whereas FIG. 1 (b) illustrates a state where both of the casings being folded. The display casing 2 is of a thin rectangular parallelepiped shape that is longer in a connecting direction, and arranged with a receiver 21 and a display 22 on a display face that is an inner casing face upon folding, and with a display 23 and a camera 24 on an outer casing face.

The receiver 21 is an output device for voice upon telephone conversation, and arranged on a side opposite to the hinge part 3 with respect to the display 22. The display 22 is a display device having a display screen of a vertically long rectangle shape, and includes herein an LCD (Liquid Crystal Display). The display 23 is a display device having a display screen of a small screen size as compared with the display 22.

The hinge part 3 is connecting means having a rotary shaft in a direction vertical to the connecting direction, and by rotating the display casing 2 around the rotary shaft with respect to the operation casing 4, both of the casings can be folded.

The camera 24 is imaging means adapted to photograph a subject to generate image data, and includes a two-dimensional image sensor such as a CCD (Charge Coupled Device).

The operation casing 4 is of a thin rectangular parallelepiped shape that is longer in the connecting direction similar to the display casing 2, and arranged with a transmitting microphone 41, a ten-key 42, an enter (decision) key 43, a direction key 44, guide keys 45 to 48, and an electrostatic pad 49 on the operation face that is the inner casing face upon folding.

The transmitting microphone 41 is an input device for voice upon telephone conversation, and arranged in a casing end part on a side opposite to the hinge part 3. The ten-key 42 is an operation key used for input of a telephone number, characters in electronic mail, or the like.

The enter key 43, the direction key 44, and the guide keys 45 to 48 are operation keys of which functions assigned depending on a usage are different and the function assignments are displayed on the screen, and also referred to as soft keys or function keys. For example, the guide key 45 is assigned with a function of activating a web browser, and the guide key 46 is assigned with a browsing function for an electronic mail. Also, the guide key 47 is assigned with a photographing function using the camera 24, and the guide key 48 is assigned with a browsing function for an address book.

The direction key 44 is one independent multifunction key with which four types of operation input can be provided according to a pressing site, i.e., up, down, right, or left, and used for scrolling of a screen display, movement of a cursor, or the like. The direction key 44 is an annularly shaped operation key having a rectangular area overlapping with the electrostatic pad 49, and arranged in the middle thereof with the enter key 43 that is a separate operation key.

The ten-key 42 is arranged on a hinge part 3 side than the transmitting microphone 41, and any of the enter key 43, the direction key 44, and the guide keys 45 to 48 is arranged on the hinge part 3 side than the ten-key 42. The enter key 43 and the direction key 44 are arranged in the middle of a shorter direction of the operation casing 4. The guide keys 45 and 46 are arranged on the left side of the direction key 44, and guide keys 47 and 48 are on the right side. The guide keys 45 and 47 are arranged on the hinge part 3 side than the guide keys 46 and 48.

Any of the operation keys 42 to 48 include a contact switching type switch having a pressing face, and by pressing the pressing face, electrical conduction between terminals is made to output an input signal.

The electrostatic pad 49 is a sensor for sensing a user operation to determine a position of the operation with use of a phenomenon in which an electrostatic capacitance of an electrode is varied by bringing a finger close thereto. The electrostatic pad 49 is formed of a thin film arranged with a plurality of electrodes, and an electrostatic capacitance of each of the electrodes is detected.

The present embodiment is adapted such that, by tracing the electrostatic pad 49 with a finger, a moving direction of the finger is inputted, and according to such a direction input, a screen display is scrolled, or a cursor is moved on the display 22.

Here, it is assumed that the electrostatic pad 49 is of a rectangular shape that is longer in the shorter direction of the operation casing 4, and arranged between the display screen of the display 22 and the operation keys 42 to 48. In particular, in the flip type cellular phone 1, the electrostatic pad 49 is arranged between the hinge part 3 and the operation keys 42 to 48. Further, the electrostatic pad 49 is formed with a part of the thin film thereof overlapping with at least parts of the pressing faces of the operation keys 44, 45, and 47, and arranged adjacent to the pressing face of the operation key (enter key) 43.

FIG. 2 is a plan view illustrating an example of the electrostatic pad 49 in the cellular phone 1 of FIG. 1, in which electrode patterns 51 and 52 formed on a flexible board are illustrated. The electrostatic pad 49 includes the thin film formed with the electrode patterns 51 and 52 on the flexible board, and in the present embodiment, it is assumed that the electrode patterns are formed of copper foil.

Each of the electrode patterns 51 and 52 includes a plurality of hexagonally shaped electrodes that are linearly arranged, and forms a parasitic capacitance with a metallic object inside the casing. A longer direction of the operation casing 4 is referred to as a Y direction, and a direction intersecting with the Y direction is referred to as an X direction. The electrode pattern 51 is one in which the plurality of electrodes are arranged in the Y direction, whereas the electrode pattern 52 is one in which the plurality of electrodes are arranged in the X direction.

The electrode pattern 51 is arranged in the Y direction with five hexagonally shaped electrodes and two electrodes having a half-hexagonal shape, and the respective electrodes are electrically connected with a wiring pattern. The electrode pattern 51 is one for detecting an operating position in the X direction, and a plurality of the electrode patterns 51 are arranged with being different in the X direction. In this example, six electrode patterns 51 are formed at regular intervals, and respectively correspond to wiring patterns $Xi$ ($i=1$ to $6$).

The electrode pattern 52 is arranged with seven electrodes in the X direction, and the respective electrodes are electrically connected with a wiring pattern. The electrode pattern 52 is one for detecting an operating position in the Y direction, and a plurality of the electrode patterns 52 are arranged in different positions from each other in the Y direction. In this example, six electrode patterns 52 are formed with regular intervals, and respectively correspond to wiring patterns $Yi$ ($i=1$ to $6$).

Also, it is assumed that each of the electrodes constituting the electrode patterns 51 and 52 is arranged so as to be surrounded by two adjacent electrodes in the Y direction and four adjacent electrodes in the X direction. That is, each of the electrode patterns 51 and 52 is adapted to be a honeycomb pattern in which one electrode is surrounded by six adjacent electrodes.

In general, when a finger comes close to the electrostatic pad 49, electrostatic capacitances are created between the electrodes of the electrostatic pad 49 and the finger, and therefore an electrostatic capacitance of an electrode pattern including an electrode closer to the finger is further increased.

In the electrostatic pad 49, such a variation in the electrostatic capacitance is detected to determine an operating position.

Here, it is assumed that an electrostatic capacitance formed by each of the electrode patterns 51 is represented by Cxi (i=1 to 6), and an electrostatic capacitance formed by each of the electrode patterns 52 is represented by Cyi (i=1 to 6), respectively. By monitoring these electrostatic capacitances Ck (k=xi, yi) to respectively specify, in the X and Y directions, electrode patterns of which electrostatic capacitances are varied, a two-dimensional position operated by a user is detected. Note that each of the above electrostatic capacitances Ck takes a combined value of the parasitic capacitance formed between each of the electrode patterns and a metallic object inside the casing and an electrostatic capacitance generated by bringing a finger or the like close to the each of the electrode patterns upon operation.

FIG. 3 is a cross-sectional view illustrating a configuration example in a main part of the cellular phone 1 in FIG. 1, in which a part of a cross section that is parallel to the longer direction of the operation casing 4 and includes the guide key 45 is illustrated. The electrostatic pad 49 is formed with a part of the thin film thereof overlapping with at least a part of a key top 53 that is the pressing face of the guide key 45. The guide key 45 includes the key top 53, a presser 56a of a PET sheet 56 arranged in the operation casing 4, a metal dome 57, and copper foil patterns 58a and 58b on a circuit board 58.

The key top 53 is a decorative panel indicating the operation key, and printed with, for example, characters or the like indicating function assignment to the operation key. The key top 53 is arranged between a decorative panel 54 on the hinge part 3 side and a decorative panel 54 on the guide key 46 side, and between the key top 53 and the decorative panel 54, a gap is provided. The decorative panel 54 on the hinge part 3 side and the decorative panel 54 on the guide key 46 side are fixed to the operation casing 4, whereas the key top 53 is adapted to be vertically movable in a thickness direction of the operation casing 4.

Specifically, by fitting the key top 53 on an urethane sheet 55 having flexibility bonded to an inside face of the decorative panel 54, the key top 53 is adapted to be vertically movable with respect to the decorative panel 54. The key top 53 and the decorative panel 54 are both made of a harder material than the urethane sheet 55; for example, synthetic resin such as polycarbonate, or metal, and bonded to the urethane sheet 55 at key points.

Below the urethane sheet 55, i.e., on the circuit board 58 side, the electrostatic pad 49 including the thin film formed with the electrode patterns on the flexible board is arranged to provide a configuration capable of detecting a variation in electrostatic capacitance of the pressing face of the key top 53. In this embodiment, the electrostatic pad 49 is arranged with overlapping with a whole of the key top 53 and a part of the decorative panel 54 on the hinge part 3 side. An overlapping area A1 between the electrostatic pad 49 and the guide key 45 is formed in an end part of the thin film on a side opposite to the hinge part 3.

Below the electrostatic pad 49, the PET sheet 56 made of PET (Polyethylene Terephthalate) is arranged. The PET sheet 56 is formed with the presser 56a protruding toward the circuit board 58, which transmits the vertical movement of the key top 53 to the metal dome 57. The presser 56a is arranged in a center of the key top 53.

The metal dome 57 is made of electrically conductive metal of a dome shape in which a central part thereof have a curvature toward the PET sheet 56, and arranged above the circuit board 58 with a circumferential part thereof being in contact with the copper foil pattern 58a. When the key top 53 is pressed down, the metal dome 57 is elastically deformed on the circuit board 58 side by the presser 56a, and the central part of the metal dome 57 comes into contact with the copper foil pattern 58b to provide electrical conduction between them, whereby the copper foil patterns 58a and 58b are electrically conducted to each other.

FIG. 4 is a plan view illustrating a configuration example of the guide key 45 in FIG. 3, in which locations of the metal dome 57 and copper foil patterns 58a and 58b on the circuit board 58 are illustrated. The metal dome 57 is of the shape in which the central part of a circular metal plate is curved. The copper foil patterns 58a and 58b are both in rectangular patterns, and arranged on a linear line parallel to the longer direction of the operation casing 4.

The copper foil pattern 58b is arranged between the copper foil pattern 58a arranged on the hinge part 3 side and the copper foil pattern 58a arranged on the guide key 46 side. The metal dome 57 is arranged such that the central part thereof is positioned above such a copper foil pattern 58b.

FIG. 5 is a diagram illustrating an equivalent circuit of the guide key 45 in FIG. 3, in which an equivalent circuit of a metal dome switch including the metal dome 57, and copper foil patterns 58a and 58b is illustrated. The metal dome 57 electrically conducted to the copper foil pattern 58a on the circuit board 58, and the metal dome switch including the copper foil pattern 58b are adapted to be a switch in which the copper foil patterns 58a and 58b are electrically conducted by elastically deforming the metal dome 57 to bring the central part of the metal dome 57 into contact with the copper foil pattern 58b.

FIG. 6 is a block diagram illustrating a configuration example of the cellular phone 1 in FIG. 1, in which an example of a functional configuration inside the cellular phone 1 is illustrated. The cellular phone 1 includes, in addition to the receiver 21, the displays 22 and 23, the camera 24, the transmitting microphone 41, and the operation keys 42 to 48, an electrostatic capacitance sensor 30 including the electrostatic pad 49, a direction input control part 31, a key input part 32, a main control part 33, a display control part 34, a cellular communication part 35, and an operating position detecting part 37.

The cellular communication part 35 is mobile communication processing means that transmits/receives a radio wave to/from a base station through a communication antenna. The main control part 33 performs a process on communication, a process of an image photographed by the camera 24, and other processes.

The electrostatic capacitance sensor 30 includes the electrostatic pad 49, and a detecting circuit 36 that measures the electrostatic capacitances Ck (k=x1 to x6, y1 to y6) in all of the electrode patterns of the electrostatic pad 49. The electrostatic capacitance sensor 30 performs an operation of outputting a result of the measured electrostatic capacitances as a sensor output.

The operating position detecting part 37 performs operations of sensing user operation and determining a corresponding operating position on the basis of the sensor output of the electrostatic capacitance sensor 30. Specifically, the respective electrostatic capacitances Ck are compared with a predetermined threshold to determine whether or not an electrode pattern of which an electrostatic capacitance exceeds the threshold is present, and thereby the user operation is sensed. In this case, upon detection of such an electrode pattern, it is determined that the user operation has been performed. Note that as the above predetermined threshold, each of the parasitic capacitances formed between the respective electrode patterns and the metallic object inside the casing during non-operation is preferably defined.

Here, it is assumed that in the case where a plurality of electrode patterns of which electrostatic capacitances exceed the corresponding thresholds are detected, a position of the centroid of the electrode patterns, or a position of an electrode pattern having a maximum electrostatic capacitance is determined as the operating position. Also, it is assumed that the term "user operation" herein includes the case of sensing the operating position not only in the state where a finger is in contact with the electrostatic pad 49, but also in a state where the finger is away from a surface of the pad.

The direction input control part 31 performs operations of, on the basis of the output of the operating position detecting part 37, sensing movement of the operating position and generating a direction input signal indicating a direction of the movement. The direction input signal is a control signal for instructing scrolling of a screen display or movement of a cursor, and upon sensing of the movement of the operating position, it is determined whether or not to generate the direction input signal, on the basis of an operating position upon start of the movement.

Specifically, if the operating position upon start of the movement is outside an input start forbidden area on the electrostatic pad 49, the direction input signal is generated, whereas if it is inside the input start forbidden area, the direction input signal is not generated. The input start forbidden area is an area where a direction input by the electrostatic pad 49 is forbidden, and formed on the thin film in relation to pressing faces of operation keys that are arranged adjacent to the thin film of the electrostatic pad 49, or with overlapping with the thin film, i.e., the operating keys 43, 44, 45, and 47 herein.

Note that the operating position on the electrostatic pad 49 refers to a contact position on the thin film at the time when a finger is brought into contact with the thin film of the electrostatic pad 49, and if the operating position is changed with the contact state being kept, the operating position is determined to be moved. That is, by the operation of sliding the finger while bringing the finger into contact with electrostatic pad 49, a desired direction input is provided. If, upon sensing of the movement of the operating position, the operating position on the electrostatic pad 49 upon start of the movement is inside the input start forbidden area, corresponding direction input becomes invalid. It is assumed that the contact state herein includes not only the case where the finger and the electrostatic pad 49 are actually in abutting contact with each other, but also the case where the finger is slightly away from the electrostatic pad 49.

The key input part 32 performs operations of detecting a user pressing operation on the pressing face of the operation key 42 to 48, and generating a key input signal corresponding to an operation key subjected to the pressing operation.

The display control part 34 performs operations of displaying image information on the display screen of the display 22 or 23, and controlling a screen display on the basis of the direction input signal. Specifically, on the basis of the direction input signal, a display position of the image information within the display screen is controlled. For example, control for, in a direction indicated by the direction input signal, scrolling the screen display, or moving the cursor is performed. Also, control for, in the direction indicated by the direction input signal, moving a highlight display, or moving a mouse pointer is performed.

The scrolling of the screen display is an operation of changing a display position, in which image information currently displayed within the screen is changed, for example, on a line-by-line basis. The movement of the cursor is an operation of changing a display position, in which a displayed object indicating an input position of a character is moved. The movement of the highlight display is an operation of changing a display position of a highlight display or the like indicating a selected item in a menu. The movement of the mouse pointer is an operation of changing a display position of a mouse pointer (icon for displaying a position) on the screen.

Here, it is assumed that the direction input signal indicating any of an upper direction, a lower direction, a left direction, or a right direction is generated, and the screen display is scrolled, the cursor is moved, or the highlight display is moved in the indicated direction. Also, it is assumed that, in the electrostatic pad 49, if a tapping operation with a finger is performed twice, i.e., a so-called double tap operation is performed, the same input process as in the case where the enter key 43 is subjected to a pressing operation is performed.

FIG. 7 is a diagram illustrating a configuration example of the electrostatic capacitance sensor 30 in the cellular phone 1 of FIG. 1. The electrostatic capacitance sensor 30 performs an operation of measuring the electrostatic capacitances $C_k$ ($k=x1$ to $x6$, $y1$ to $y6$) of the respective electrode patterns of the electrostatic pad 49 to output a result of the measurement as the sensor output.

In general, in the case where a current not varied with time is supplied to charge a capacitor having an electrostatic capacitance $C_k$, as the electrostatic capacitance $C_k$ is increased, it takes a longer time for the charging. In the electrostatic capacitance sensor 30, a correlationship between an electrostatic capacitance and a charging time is used to measure the respective electrostatic capacitances $C_k$.

Specifically, the electrostatic capacitance sensor 30 includes: a capacitor having each of the electrostatic capacitances $C_k$, i.e., the electrostatic pad 49; and a detecting circuit 36 including switches SW1 and SW2, a constant current source 11, a capacitor Cmod used for charging the electrostatic capacitance $C_k$, a comparator 12, a timer 13, and an electrostatic capacitance detecting part 14, and the each electrostatic capacitance $C_k$ is determined on the basis of a time necessary to charge the electrostatic capacitance $C_k$ up to a predetermined voltage.

The switch SW1 is connected in parallel with the electrostatic capacitance $C_k$, and by closing the switch SW1, the electrostatic capacitance $C_k$ can be discharged. The switch SW2 is connected in series with the capacitor Cmod, and by closing the switch SW2 with opening the switch SW1, the electrostatic capacitance $C_k$ can be charged by charges accumulated in the capacitor Cmod. An output of the constant current source 11 is supplied between the switch SW2 and the capacitor Cmod, and when the switch SW2 is opened, the capacitor Cmod is charged.

A voltage applied to the capacitor Cmod is supplied to the comparator 12 through a low pass filter circuit. The comparator 12 performs operations of comparing the output voltage of the capacitor Cmod and a predetermined voltage Vref, and supplying a signal corresponding to a result of the comparison to the timer 13.

The timer 13 performs operations of measuring a time necessary for the output voltage of the capacitor Cmod to reach the voltage Vref after the switch SW2 is closed, and outputting a result of the measurement to the electrostatic capacitance detecting part 14. The electrostatic capacitance detecting part 14 performs an operation of determining the electrostatic capacitance from the time necessary for the output voltage of the capacitor Cmod to reach the voltage Vref. The electrostatic capacitance determination based on the measurement result of the timer 13 is sequentially made for all of the electrostatic capacitances Ck, and a determination result for each of the electrostatic capacitances Ck is outputted as the sensor output.

Next, operations of the electrostatic capacitance sensor 30 are described. First, the capacitor Cmod is charged with the switches SW1 and SW2 being opened. Then, the switch SW1 is closed to discharge the electrostatic capacitance Ck.

Subsequently, after the switch SW1 is opened, the switch SW2 is closed, and charges accumulated in the capacitor Cmod is used as a source to charge the electrostatic capacitance Ck. At this time, the time necessary for the voltage applied to the electrostatic capacitances Ck and Cmod to reach the voltage Vref is measured in the timer 13, and a result of the measurement is outputted as the time necessary to charge the electrostatic capacitance Ck. The electrostatic capacitance detecting part 14 determines the electrostatic capacitance Ck on the basis of the output of the timer 13. Such a determination process of the electrostatic capacitance is repeatedly performed at a predetermined sampling rate.

FIG. 8 is a plan view illustrating a configuration example in the main part of the cellular phone 1 in FIG. 1, in which the electrostatic pad 49 formed with input start forbidden areas A11, A21, and A31 in relation to the pressing faces of the operation keys 44, 45, and 47 is illustrated. The respective input start forbidden areas A11, A21, and A31 are areas on the thin film, each in which direction input by the electrostatic pad 49 is forbidden, and formed in relation to the respective pressing faces of the operation keys 44, 45, and 47.

The guide keys 45 and 47 are both arranged with a whole of the pressing faces thereof overlapping with the thin film of the electrostatic pad 49. Here, it is assumed that the guide key 45 is arranged with the key top part thereof being adjacent to a lower edge side and left edge side of the thin film, and the guide key 47 is arranged with the key top part thereof being adjacent to the lower edge side and a right edge side of the thin film. That is, the guide key 45 is arranged in the lower left corner of the thin film, and the guide key 47 in the lower right corner.

The direction key 44 is arranged with an upper part of the pressing face thereof overlapping with the thin film of the electrostatic pad 49. Here, it is assumed that the direction key 44 is arranged with the key top part thereof overlapping with the lower edge side of the thin film. The pressing faces of the operation keys 44, 45, and 47 are all arranged below the middle of the thin film.

The input start forbidden areas A11, A21, and A31 are respectively formed as areas including overlapping areas A12, A22, and A32 with the operation keys. Here, it is assumed that any of the respective input start forbidden areas A11, A21, and A31 is an area that is expanded with a corresponding overlapping area facing outward. In the electrostatic pad 49, the input start forbidden areas are formed on the thin film on a side opposite to the hinge part 3, and the hinge part 3 side is outside the input start forbidden areas.

FIG. 9 is a diagram illustrating an example of operations upon sensing of movement in the cellular phone 1 of FIG. 1, in which various types of direction inputs B1 to B5 of which operating positions upon start of movement when the electrostatic pad 49 is traced with a finger are illustrated. The direction input B1 is one that starts to move inside the input start forbidden area A11, and completes the movement outside the input start forbidden areas, so that such direction input is invalidated. The direction input B2 is one that starts to move outside the input start forbidden areas, and completes the movement inside the input start forbidden area A11, so that such direction input is valid, and a direction input signal indicating a moving direction, i.e., a lower direction in this case, is generated.

Any of the two types of direction inputs B3 and B4 is one that starts to move outside the input start forbidden areas, and completes the movement outside the input start forbidden areas, so that such types of direction input are valid, and direction input signals indicating moving directions, i.e., an upper direction and a right direction in this case, are respectively generated. The direction input B5 is one that starts to move inside the input start forbidden area A21, and completes the movement inside the input start forbidden area A31, so that such direction input is also invalidated.

Here it is assumed that, in the case where a finger is slid from an area outside the electrostatic pad 49 to trace the electrostatic pad 49, if an initial operating position on the electrostatic pad 49 is inside any of the input start forbidden areas in the movement of an operating position, corresponding direction input is invalidated, whereas if the initial operation position is outside the input start forbidden areas, corresponding direction input is provided.

As described above, in the present embodiment, when upward, leftward, or rightward movement of which an operating position upon start of the movement is inside any of the input start forbidden areas is sensed, corresponding direction input is invalidated, and upward, leftward, or rightward movement of image information is forbidden. By configuring as above, an unintended direction input can be effectively prevented from being provided upon operation of the operation keys that are arranged below the middle of the electrostatic pad 49 with overlapping with the electrostatic pad 49.

Steps S101 to S107 in FIG. 10 are respective steps of a flow chart illustrating an example of the operations upon sensing of movement in the cellular phone 1 of FIG. 1. First, when the operating position detecting part 37 detects a user operation on the electrostatic pad 49, it determines a position of the operation on the thin film, and outputs a result of the determination to the direction input control part 31 (Step S101).

When the direction input control part 31 senses, on the basis of the output from the operating position detecting part 37, movement of the operating position with a finger being in contact with the electrostatic pad 49, it generates a direction input signal indicating a direction of the movement (Step S102). When the movement of the operating position is sensed, an operating position upon start of the movement is determined, and it is determined whether or not to generate a direction input signal, depending on whether or not the operating position is inside any of input start forbidden areas (Steps S103 and S104).

If the operating position upon start of the movement is inside any of the input start forbidden areas, a direction input is invalidated (Step S105). On the other hand, if the operating position upon start of the movement is outside the input start forbidden areas, the direction input signal corresponding to a direction of the movement is generated, and a display position of image information is moved by the display control part 34 (Steps S106 and S107).

According to the present embodiment, a direction input signal is appropriately generated depending on an operating position upon start of movement, and therefore upon operation of the operation keys that are arranged with overlapping with the electrostatic pad 49, a direction input for controlling a display position of image information can be suppressed form being erroneously provided. In particular, by providing an input start forbidden area as an area where a direction input is desirably forbidden, the direction input signal is appropriately generated depending on whether or not the operating position upon start of the movement is inside an input start forbidden area, and therefore an unintended direction input can be prevented from being provided. Also, the input start forbidden area includes an overlapping area between a pressing surface and the thin film, and therefore a direction input of which an operating position upon start of movement is at least inside the overlapping area can be forbidden.

Note that the present embodiment describes an example of the case where the electrostatic pad is formed with overlapping with the pressing faces of the operation keys; however, the present invention is not limited to this. For example, in the case where an operation key is arranged with a pressing face thereof being adjacent to the electrostatic pad, an area that is on the thin film and adjacent to the pressing face of the operation key may be defined as the input start forbidden area. Alternatively, an area including a part of an overlapping area between the electrostatic pad and the operation key may be defined as the input start forbidden area.

FIG. 11 (a) to (d) are plan views illustrating other configuration examples of the cellular phone 1 in FIG. 1, in which electrostatic pads 61 formed with input start forbidden areas C1, C2, C4, and C7 in relation to pressing faces of operating keys 62, respectively, are illustrated.

Second Embodiment

FIG. 11 (a) illustrates a case where, with respect to the operation key 62 arranged with the pressing face being adjacent to a thin film of the electrostatic pad 61, an area that is adjacent to the pressing face and on the thin film is defined as the input start forbidden area C1. In this case, the operation key 62 is arranged with the pressing face (key top part) thereof being adjacent to a lower edge side of the thin film of the electrostatic pad 61.

By configuring as above, even in the case where the electrostatic pad 61 and the operation key 62 are arranged adjacent to each other, a direction input signal is appropriately generated depending on an operating position upon start of movement, and therefore upon operation of the operation key 62, a direction input for controlling a display position of image information can be suppressed from being erroneously provided.

Third Embodiment

FIG. 11 (b) illustrates a case where, with respect to the operation key 62 arranged with a part of the pressing face overlapping with the thin film of the electrostatic pad 61, an area that includes an overlapping area C3 and is on the thin film is defined as the input start forbidden area C2. In this case, the operation key 62 is arranged with the pressing face thereof overlapping with a lower edge side of the thin film of the electrostatic pad 61.

Fourth Embodiment

FIG. 11 (c) illustrates a case where, with respect to the operation key 62 arranged with a whole of the pressing face overlapping with the thin film of the electrostatic pad 61, an area including: an overlapping area C5; and an area C6 sandwiched between an edge side 61a closest to the overlapping area C5 and the overlapping area C5 is defined as the input start forbidden area C4.

In this case, the operation key 62 is arranged with the whole of the pressing face thereof overlapping with the thin film of the electrostatic pad 61, and the area sandwiched between the overlapping area C5 and the lower edge side 61a of the thin film is defined as the area C6.

By configuring as above, the input start forbidden area C7 includes the overlapping area C5 between the pressing face and the thin film, and the area C6 sandwiched between the edge side 61a of the thin film and the overlapping area C5, and therefore upon operation of the operation key 61, an unintended direction input can be effectively prevented from being provided.

Fifth Embodiment

FIG. 11 (d) illustrates a case where, with respect to the operation key 62 arranged with a whole of the pressing face overlapping with the thin film of the electrostatic pad 61, an area including a part of an overlapping area is defined as the input start forbidden area C7. In this case, the operation key 62 is arranged with the whole of the pressing face thereof overlapping with the thin film of the electrostatic pad 61, and an area including a lower part of the overlapping area is defined as the input start forbidden area C7.

By configuring as above, an upper part of the pressing face of the operation key 62 to be outside the input start forbidden area C7, and therefore the upper part of the pressing face can be used to provide a direction input.

In each of the above embodiments, the cellular phone in which a part of the electrode pad overlaps with the operation key is described. In an embodiment described below, a cellular phone provided with an electrode pad formed with a virtual key is described.

Meanwhile, in a notebook personal computer, there has been conventionally used an input device that moves a cursor (mouse pointer) on a screen by sliding a finger on an electrostatic pad, and provides input depending on a position of the cursor by an operation of tapping a surface of the pad, i.e., a so-called tap operation.

A mobile information terminal such as a cellular phone, or PDA (Personal Digital Assistant) has a small casing, and a narrow arrangement space for operation keys as compared with the notebook personal computer, and therefore it is convenient to provide a plurality of input keys on an electrostatic pad to provide a key input. In this case, by displaying an icon corresponding to each of the input keys on a screen, and upon key input, by sliding a finger on the electrostatic pad, a cursor on the screen is moved to select a desired input key. In general, the mobile information terminal is often operated with the casing thereof being held by one hand. For this reason, in the mobile information terminal as described above, there is a problem that in a case where an input key is selected, and then key input is provided by a tap operation, a finger should be once moved away from a pad surface upon the tap operation, resulting in poor operability. In particular, in the case of the cellular phone, a one-handed operation is often performed, resulting in a problem of being extremely hard to operate.

A sixth embodiment described below relates to a mobile information terminal and a cellular phone in which a phenomenon of an electrostatic capacitance of an electrode being varied when a finger is brought close to the pad is used to sense a user operation, and operability upon key input is improved. In the present embodiment, in particular, in a case where an electrostatic pad is operated by one hand to provide key input, the key input can be provided without moving a finger away from a surface of the pad.

Sixth Embodiment

FIGS. 12 (a) and (b) are appearance diagrams illustrating an example of a schematic configuration of a mobile information terminal according to a sixth embodiment, in which a flip type cellular phone 1 is illustrated as an example of the mobile information terminal. The cellular phone 1 of which the display casing 2 and the operation casing 4 are connected to each other through the hinge part 3 can also be folded with one face of the display casing 2 and that of the operation casing 4 facing to each other. Note that the same components as those in the above first embodiment are represented by the same reference numerals, and description thereof is omitted.

The operation casing 4 is of a thin rectangular parallelepiped shape that is longer in the connecting direction, similar to the display casing 2, and arranged with a transmitting microphone 41, a plurality of operation keys 42a such as an on-hook key, an off-hook key, and a ten-key, and the electrostatic pad 49 on an operation face that is an inner casing face upon folding.

Each of the operation keys 42a includes a contact switching type switch having a pressing face, and by pressing the pressing face, electrical conduction between terminals is made to thereby output a predetermined input signal.

The cellular phone can transit between an expanded state where both of the casings are expanded with a display face and the operation face facing in the same direction, and a containing state where both of the casings are folded with the display face and the operation face facing to each other.

The electrostatic pad 49 is a sensor for sensing a user operation with use of a phenomenon in which an electrostatic capacitance of an electrode is varied by bringing a finger close thereto, and determining a position of the operation. The electrostatic pad 49 is formed of a thin film arranged with a plurality of electrodes, and an electrostatic capacitance of each of the electrodes is detected.

Here, it is assumed that the electrostatic pad 49 is of a rectangular shape that is longer in a shorter direction of the operation casing, and provided between a display screen of a display 22 and the operation keys 42a. In particular, in the flip type cellular phone 1, the electrostatic pad 44 is arranged between a hinge part 3 and the operation keys 42a. We also assume that the electrostatic pad 49 is adapted such that a width thereof, i.e., a horizontal length thereof is comparable to that of the display screen of the display 22.

In the cellular phone 1, a plurality of virtual keys are formed on the electrostatic pad 49, and locations of the respective virtual keys are displayed on the display screen of the display 22. The virtual keys are input keys that can be respectively assigned with different functions depending on an operational situation, and also input keys of which sizes, locations, number, and the like can be changed as necessary. In this example, the display screen of the display 22 is provided in a location different from those of the virtual keys.

Here, it is assumed that icons indicating the locations of the respective virtual keys are displayed in a key location display area 22a on the display screen. The key location display area 22a is a display area formed on the display screen of the display 22. The key location display area 22a is formed on a side close to the electrostatic pad 49, i.e., adjacent to a shorter side of the display screen on the hinge part 3 side.

FIG. 13 is a block diagram illustrating a configuration example of the cellular phone 1 in FIG. 12, in which an example of a functional configuration inside the cellular phone 1 is illustrated. The cellular phone 1 has, similar to the above first embodiment, the receiver 21, the displays 22 and 23, the camera 24, the transmitting microphone 41, the electrostatic capacitance sensor 30 including the electrostatic pad 49, the operating position detecting part 37, the main control part 33, the display control part 34, and the cellular communication part 35. Further, the cellular phone 1 of the present embodiment includes a pressing operation detecting part 38 and a virtual key operation input part 39.

Note that the electrostatic pad 49 has the same configuration as that of the electrostatic pad 49 of the first embodiment illustrated in FIG. 2; the electrostatic capacitance sensor 30 also has the same configuration as that of the electrostatic capacitance sensor 30 of the first embodiment illustrated in FIG. 7; the operating position detecting part 37 also has the same configuration as that in the first embodiment; and therefore description of them is omitted.

The pressing operation detecting part 38 performs an operation of detecting a variation in pressing force on the basis of a sensor output of the electrostatic capacitance sensor 30. Specifically, a variation in electrostatic capacitance of an electrode pattern arranged around an operating position detected by the operating position detecting part 37 is determined, and on the basis of a result of the determination, an increase in pressing force is detected.

For example, the increase in pressing force is detected on the basis of a variation in electrostatic capacitance of an electrode pattern arranged adjacent to an electrode pattern at the operating position. Alternatively, the increase in pressing force is detected on the basis of a variation in electrostatic capacitance of an electrode pattern arranged within a predetermined distance from the operating position.

In general, if a finger is more firmly pressed with being in contact with the electrostatic pad 49, the finger is compressed due to an increase in pressing force, and therefore a distance between the electrostatic pad 49 and the finger becomes shorter. In the pressing operation detecting part 38, such an increase in pressing force on the electrostatic pad 49 is detected on the basis of a variation in electrostatic capacitance around an operating position.

The display control part 34 performs an operation of displaying image information on the display screens of the displays 22 and 23. In the present embodiment, there are performed operations of displaying on the display screen of the display 22 the locations of the virtual keys on the electrostatic pad 49, and also displaying an operating position detected by the operating position detecting part 37 on the same display screen. The display of the locations of the virtual keys is provided by displaying the icons indicating the virtual keys in the key location display area 22a in relation to the locations on the electrostatic pad 49.

The display of the operating position is provided by displaying a cursor indicating the operating position in relation to the operating position on the electrostatic pad 49. The cursor is an icon for displaying a position, and in the present embodiment, when a finger is brought close to the electrostatic pad 49, the cursor is displayed at a position corresponding to the operating position.

It is assumed that, even in the present embodiment, by sliding a finger on the electrostatic pad 49 with the finger being in contact with it, the cursor moves upward, downward, leftward, or rightward.

The virtual key operation input part 39 performs an operation of, if an increase in pressing force is detected by the pressing operation detecting part 38, generating an operation input signal of a virtual key on the basis of an operating position detected by the operating position detection part 37. The operation input signal of the virtual key is an input signal generated according to the operating position on the electrostatic pad 49. On the basis of such an operation input signal, a function assigned to the virtual key at the operating position is performed.

Specifically, if an increase in pressing force is detected after an operation at the time a user slides his/her finger on the electrostatic pad 49 while bringing the finger into contact with the pad, an operation input signal is generated on the basis of an operating position upon detection of the increase in pressing force. That is, if a series of operations is performed, i.e., the sliding operation of sliding the finger on the electrostatic pad 49 without moving the finger away from the electrostatic pad 49, and the pressing operation for increasing pressing force are performed, the operation input signal is generated on the basis of an operating position at the time of the pressing operation after the sliding operation.

Such a virtual key is assigned with, for example, a function of activating a web browser, or browsing an electronic mail. Alternatively, it is assigned with a photographing function using the camera 24, or a browsing function for an address book.

FIGS. 14 (a) and (b) are plan views illustrating a configuration example in a main part of the cellular phone 1 in FIG. 12. FIG. 14 (a) illustrates icons 22b displayed in the key location display area 22a in relation to locations of virtual keys 49a on the electrostatic pad 49. FIG. 14 (b) illustrates the plurality of virtual keys 49a formed on the electrostatic pad 49.

The respective virtual keys 49a are input keys that can be respectively assigned with different functions depending on an operational situation, and sizes and locations of the respective input keys, and the number of the input keys are changed as necessary. In this example, the virtual keys 49a are arrayed in a matrix form of 2 rows by 4 columns.

The icons 22b are arranged with relative positions of the virtual keys 49a to the electrostatic pad 49 and relative positions of the icons 22b to the key location display area 22a coinciding with each other. In this example, icons "Key 1" to "Key 4" are arranged in an upper row, and icons "Key 5" to "Key 8" are arranged in a lower row.

FIG. 15 is a diagram illustrating an example of operations upon key input by the electrostatic pad 49 in the cellular phone 1 of FIG. 12, in which a situation where a finger is slid on the electrostatic pad 49 and then the key input is provided by firmly pressing the electrostatic pad 49 is illustrated. If the finger is brought close to the electrostatic pad 49 upon operation of the virtual keys 49a, a corresponding operation is sensed, and a cursor A1 is displayed at a position in the display screen corresponding to a sensed operating position. Then, if the finger is slid on the electrostatic pad 49 with being in contact with the electrostatic pad 49, the cursor A1 can be moved.

By sliding the finger on the electrostatic pad 49 to move the cursor A1 to a desired icon 22b, and when the cursor A1 is positioned on the desired icon 22b, by more firmly pressing the finger with the finger being in contact with the electrostatic pad 49, the pressing operation is sensed as firm press, and an operation input signal corresponding to the operating position is generated.

In this example, the operation is sensed at a position of the icon "Key 5" illustrated in FIG. 14 (a), and display of the cursor A1 is started. Then, by sliding the finger rightward, the cursor A1 is moved to a position of the icon "Key 7", and by subsequent firm press, an operation input of a virtual key 49a corresponding to the icon "Key 7" is provided.

FIGS. 16 (a) and (b) are diagrams illustrating an appearance of a finger in the case where the finger is more firmly pressed with being in contact with the electrostatic pad 49. FIG. 16 (a) illustrates an appearance as viewed from a side face side of the operation casing 4, and FIG. 16 (b) illustrates an appearance as viewed from a tip side of the finger. In a state where the finger is slightly pressed against the electrostatic pad 49, a pressing force on the finger is small, so that deformation of the finger is small, and an area of a contact part B1 between the finger and a surface of the pad is also small.

If, from this state, the finger is more firmly pressed against the electrostatic pad 49, the deformation of the finger becomes larger, and an area of a contact part B2 between the finger and the pad surface is large.

Given that the center C1 of the finger as viewed from the tip side is defined as the centroid in a cross-sectional shape of the finger, a distance between the finger and the electrostatic pad 49 can be considered as a distance between the center C1 and the pad surface. In the state where the finger is slightly pressed, the distance between the center C1 and the pad surface is d1, whereas in the state where the finger is more firmly pressed, the distance between the center C1 and the pad surface is d2 (d2<d1). That is, even in the contact state, by more firmly pressing the finger against the electrostatic pad 49, the finger can be brought closer to the electrostatic pad 49.

In the present embodiment, such closeness of the finger in the contact state is sensed as an increase in pressing force in a user operation, and then a key input is provided.

FIG. 17 is a diagram illustrating an example of operations upon detection of pressing operation in the cellular phone 1 of FIG. 12, in which electrostatic capacitance distributions before (distribution indicated by dashed line) and after firm press (distribution indicated by solid line) are illustrated. A state before the firm press corresponds to the state where the finger is slightly pressed against the electrostatic pad 49. The electrostatic capacitance distribution in this state has a maximum at an operating positional, and is represented by a curve that approaches a constant value C0 as a position is moved away from the operating positional.

On the other hand, a state after the firm press corresponds to the state where the finger is more firmly pressed against the electrostatic pad 49, and the electrostatic capacitance distribution in this state has large electrostatic capacitances around the operating positional as compared with the electrostatic capacitance distribution before the firm press. For example, an electrostatic capacitance at a position a2 is increased by b1 than that before the firm press.

In the present embodiment, on the basis of such a variation in electrostatic capacitance around the operating positional a1, the pressing operation on the electrostatic pad is sensed, and a key input is provided. Specifically, on the basis of a variation in electrostatic capacitance of an electrode pattern positioned around the operating positional a1, i.e., an electrode pattern adjacent to an electrode pattern at the operating position a1, or an electrode pattern within a predetermined distance from the operating positional a1, the pressing operation is sensed.

Note that, if a resolution upon determination of the operating positional, i.e., a density of electrodes on the electrostatic pad 49 is small as compared with a displacement of the finger on the electrostatic pad 49, it is considered that there occurs a case where slight movement of the finger on the electrostatic pad 49 cannot be determined. In order to accurately detect the pressing operation even in such a case, a variation in pressing force is desirably determined from variations of electrostatic capacitances of two or more electrode patterns.

For example, the variation in pressing force may be determined on the basis of variations of electrostatic capacitances of three electrode patterns arranged around the operating positional. In this case, from the perspective of preventing the slight movement of the finger on the electrostatic pad 49 from being erroneously detected as the pressing operation (firmly pressing operation), electrostatic capacitances of electrode patterns positioned on sides opposite to each other with respect to the operating positional are monitored, and the variation in pressing force is desirably determined from variations of the electrostatic capacitances of these electrode patterns.

In this example, there is provided a case where the variation in pressing force is determined on the basis of variations (b1 and b2 respectively) of electrostatic capacitances of two electrode patterns (positions a2 and a3) positioned on the sides opposite to each other with respect to the operating positional a1. According to such a configuration, the slight movement of the finger slightly pressed against the electrostatic pad 49 can be prevented from being erroneously sensed as the pressing operation.

Steps S201 to S206 of FIG. 18 are respective steps of a flow chart illustrating an example of operations of the cellular phone 1 in FIG. 12, in which processing steps upon a key input by the electrostatic pad 49 are illustrated. First, when the operating position detecting part 37 senses a user operation on the electrostatic pad 49, it determines an operating position, and outputs a result of the determination (Steps S201 and S202).

Then, the display control part 34 displays, the cursor A1 indicating the operating position in the display screen (Step S203) on the basis of the determination result by the operating position detecting part 37. The display control part 34 repeats processing steps of Steps S202 and S203 until a variation in pressing force is detected by the pressing operation detecting part 38, or an operation on the electrostatic pad 49 is terminated.

When the variation in pressing force is detected by the pressing operation detecting part 38, the virtual key operation input part 39 generates an operation input signal of the virtual key 49a on the basis of the operating position upon detection of the variation in pressing force (Steps S204 and S205). On the other hand, if the operation on the electrostatic pad 49 is terminated before the detection of the variation in pressing force, the key input operation is terminated without generating the operation input signal (Step S206).

According to the present embodiment, an increase in pressing force on the electrostatic pad 49 is detected to provide a key input, and therefore if the electrostatic pad 49 is operated to provide the key input, the key input can be provided without moving a finger away from the electrostatic pad 49. Accordingly, operability for the case where the finger contact is sensed to provide the key input can be improved. Also, if the finger is brought close to the electrostatic pad 49, the cursor A1 appears at a position to be operated, and therefore a displacement of the cursor A1 upon key input can be suppressed as compared with a case where the cursor A1 is constantly displayed.

In addition, in the present embodiment, there is described the case where an operating position is displayed by the cursor A1, and the cursor is moved when a finger is slid on the electrostatic pad 49; however, the present invention is not limited to this. For example, the operating position may be displayed by highlighting (reverse display or the like) the icon 22b indicating the virtual key 49a, and a display position of the highlight display may be changed when the finger is slid.

Also, in the present embodiment, there is described the case where a variation in pressing force is detected on the basis of variations of electrostatic capacitances of electrode patterns arranged around an operating position; however, the present invention is not limited to this. For example, a contact area between a finger and the electrostatic pad 49 may determined on the basis of the number of electrode patterns of which electrostatic capacitances exceed a predetermined threshold, and the variation in pressing force may be detected on the basis of a result of the determination.

Note that configuration examples of a mobile information terminal and a cellular phone having an electrode pad formed with a virtual key like the cellular phone of the above sixth embodiment include the following inventions.

First Aspect of the Present Invention

A mobile information terminal according to a first aspect of the present invention is configured to include: an electrostatic capacitance sensor that includes a thin film arranged with a plurality of electrodes, and detects an electrostatic capacitance of each of the electrodes; operating position detecting means that detects an operating position of a user on the basis of an output of the electrostatic capacitance sensor; pressing operation detecting means that detects a variation in pressing force of the user operation on the basis of the output of the electrostatic capacitance sensor; display means having a display screen that displays a location of a virtual key formed on the thin film of the electrostatic capacitance sensor; display control means that displays the operating position detected by the operating position detecting means in the display screen; and virtual key operation input means that, upon detection of an increase in pressing force by the pressing operation detecting means, generates an operation input signal of the virtual key on the basis of the operating position.

In the mobile information terminal, the user operation on the thin film is sensed on the basis of the output of the electrostatic capacitance sensor, and the corresponding operating position is displayed in the display screen. At this time, on the basis of the output of the electrostatic capacitance sensor, the variation in pressing force of the user operation is detected, and upon detection of the increase in pressing force, the operation input signal of the virtual key is generated on the basis of the operating position. In general, if a finger is more firmly pressed against the thin film of the electrostatic capacitance sensor with being in contact with the thin film, the finger is compressed by an increase in pressing force, and therefore a distance between the thin Film and the finger becomes shorter. In the above mobile information terminal, such an increase in pressing force on the thin film is detected to provide a key input, and therefore the key input can be provided without moving a finger away from the thin film when the electrostatic capacitance sensor is operated to provide a key input. Accordingly, operability for the case where the finger contact is sensed to provide the key input can be improved.

Second Aspect of the Present Invention

A mobile information terminal according to a second aspect of the present invention is, in addition to the above configuration, configured such that the display screen is provided in a location different from a location of the virtual key.

Third Aspect of the Present Invention

A mobile information terminal according to a third aspect of the present invention is, in addition to the above configuration, configured such that, upon detection of the increase in pressing force after an operation at the time when the user slides the finger on the thin film with bringing the finger into contact with the thin film, the virtual key operation input means generates the operation input signal on the basis of an operating position upon the detection of the increase in pressing force.

Fourth Aspect of the Present Invention

A mobile information terminal according to a fourth aspect of the present invention is, in addition to the above configuration, configured such that the pressing operation detecting means detects the increase in pressing force of the user operation on the basis of a variation of an electrostatic capacitance of one of the electrodes, the one being arranged around the operating position detected by the operating position detecting means.

Fifth Aspect of the Present Invention

A cellular phone according to a fifth aspect of the present invention including a display casing having a display screen; an operation casing having an operation key; and a connecting part connecting the display casing and the operation casing, is configured to include: an electrostatic pad that includes a thin film arranged with a plurality of electrodes, and is provided in the operation casing on the connecting part side of the operation key; electrostatic capacitance detecting means that detects an electrostatic capacitance of each of the electrodes; operating position detecting means that detects an operating position of a user on the basis of a result of the detection by the electrostatic capacitance detecting means; pressing operation detecting means that detects a variation in pressing force of the user operation on the basis of the result of the detection by the electrostatic capacitance detecting means; display control means that displays on the display screen a location of a virtual key formed on the electrostatic pad, and also displays in the display screen the operating position detected by the operating position detecting means; and virtual key operation input means that, upon detection of an increase in pressing force by the pressing operation detecting means, generates an operation input signal of the virtual key on the basis of the operating position.

As described, according to the mobile information terminal and the cellular phone of the present invention, the increase in pressing fore on the thin film is detected to provide a key input, and therefore if the electrostatic capacitance sensor is operated to provide the key input, the key input can be provided without moving a finger away from the thin film. In particular, if the electrostatic pad is operated with one hand to provide a key input, the key input can be provided without moving the finger away from a surface of the pad. Accordingly, operability for the case where the finger contact is sensed to provide a key input can be improved.

This application claims priority from the following patent applications in Japan: the patent application (Japanese Patent Application No. 2007-097160) filed on Apr. 3, 2007, and the patent application (Japanese Patent Application No. 2007-097161) filed on Apr. 3, 2007, under the Paris Convention, and the entire content of the patent applications is incorporated herein by reference.

BRIEF DESCRIPTION OF THE DRAWINGS

FIG. 1 is an appearance diagram illustrating an example of a schematic configuration of a mobile information terminal according to the present embodiment, in which a flip type cellular phone 1 is illustrated as an example of a mobile information terminal.

FIG. 2 is a plan view illustrating an example of an electrostatic pad 49 in the cellular phone 1 of FIG. 1, in which electrode patterns 51 and 52 formed on a flexible board are illustrated.

FIG. 3 is a cross-sectional view illustrating a configuration example of a main part of the cellular phone 1 in FIG. 1, in which a part of a cross section that is parallel to a longer direction of an operation casing 4 and includes a guide key 45 is illustrated.

FIG. 4 is a plan view illustrating a configuration example of the guide key 45 in FIG. 3, in which locations of a metal dome 57 and copper foil patterns 58a and 58b on a circuit board 58 are illustrated.

FIG. 5 is a diagram illustrating an equivalent circuit of the guide key 45 in FIG. 3, in which an equivalent circuit of a metal dome switch including the metal dome 57, and the copper foil patterns 58a and 58b is illustrated.

FIG. 6 is a block diagram illustrating a configuration example of the cellular phone 1 in FIG. 1, in which an example of a functional configuration inside the cellular phone 1 is illustrated.

FIG. 7 is a diagram illustrating a configuration example of an operating position detecting part 37 in the cellular phone 1 of FIG. 1.

FIG. 8 is a plan view illustrating a configuration example in the main part of the cellular phone 1 in FIG. 1, in which the electrostatic pad 49 formed with input start forbidden areas A11, A21, and A31 is illustrated.

FIG. 9 is a diagram illustrating an example of operations upon sensing of movement in the cellular phone 1 of FIG. 1, in which there are illustrated various types of direction inputs B1 to B5 of which operating positions upon start of movement are different.

FIG. 10 is a flow chart illustrating an example of the operations upon sensing of movement in the cellular phone 1 of FIG. 1.

FIG. 11 is a plan view illustrating other configuration examples of the cellular phone 1 of FIG. 1, in which electrostatic pads 61 respectively formed with input start forbidden areas C1, C2, C4, and C7 are illustrated.

FIG. 12 is an appearance diagram illustrating an example of a schematic configuration of a mobile information terminal according to the sixth embodiment, in which a flip type cellular phone 1 is illustrated as an example of the mobile information terminal.

FIG. 13 is a block diagram illustrating a configuration example of the cellular phone 1 in FIG. 12 according to the sixth embodiment, in which an example of a functional configuration inside the cellular phone 1 is illustrated.

FIG. 14 is a plan view illustrating a configuration example of a main part of the cellular phone 1 in FIG. 12 according to the sixth embodiment.

FIG. 15 is a diagram illustrating an example of operations upon a key input by an electrostatic pad 49 in the cellular phone 1 of FIG. 12 according to the sixth embodiment.

FIG. 16 is a diagram illustrating an appearance of a finger for the case where the finger is more firmly pressed with being in contact with the electrostatic pad 49.

FIG. 17 is a diagram illustrating an example of operations upon detection of a pressing operation in the cellular phone 1 of FIG. 12 according to the sixth embodiment, in which electrostatic capacitance distributions before and after firm press are illustrated.

FIG. 18 is a flow chart illustrating an example of operations of the cellular phone 1 in FIG. 12 according to the sixth embodiment, in which processing steps upon key input by the electrostatic pad 49 are illustrated.

What is claimed is:

1. A mobile information terminal comprising:
an electrostatic capacitance sensor including a thin film arranged with a plurality of electrodes, and detecting an electrostatic capacitance of each of said electrodes;
an operating position detecting means detecting an operating position of a user on a basis of an output of said electrostatic capacitance sensor;
direction input control means sensing movement of said detected operating position on a basis of an output of said operating position detecting means, and generating a direction input signal indicating a direction of the movement;

a key input means detecting a pressing operation of the user on a pressing face, and generating a key input signal;

a display means having a display screen for displaying image information; and a display control means controlling a display position of said image information in said display screen on a basis of said direction input signal, wherein a part of said thin film of said electrostatic capacitance sensor is formed with overlapping with at least a part of said pressing face of said key input means, and said direction input control means generates said direction input signal when the detected operating position upon start of the movement is outside an input start forbidden area formed on said thin film in relation to said pressing face, and does not generate said direction input signal when the detected operating position is inside said input start forbidden area.

2. The mobile information terminal according to claim 1, wherein
said input start forbidden area includes an overlapping area between said pressing face and said thin film.

3. The mobile information terminal according to claim 2, wherein
said input start forbidden area includes an area sandwiched between an edge side of said thin film and said overlapping area, the edge side being closest to said overlapping area.

4. The mobile information terminal according to claim 1, wherein
said pressing face of said key input means is arranged below a middle of said thin film, and
said direction input control means senses vertical movement of the detected operating position to generate a direction input signal indicating any of an upper direction and a lower direction, and upon sensing of upward movement of which the detected operating position upon start of the movement is inside said input start forbidden area, forbids upward movement of said image information.

5. A mobile information terminal comprising:
an electrostatic capacitance sensor including a thin film arranged with a plurality of electrodes, and detecting an electrostatic capacitance of each of said electrodes;
operating position detecting means detecting an operating position of a user on a basis of an output of said electrostatic capacitance sensor;
direction input control means, on a basis of an output of said operating position detecting means, sensing movement of said detected operating position, and generating a direction input signal indicating a direction of the movement;
key input means detecting a pressing operation of the user on a pressing face, and generating a key input signal;
display means having a display screen for displaying image information; and
display control means controlling a display position of said image information in said display screen on a basis of said direction input signal, wherein
said pressing face of said key input means is arranged adjacent to said thin film of said electrostatic capacitance sensor,
said direction input control means generates said direction input signal in the case where the detected operating position upon start of the movement is outside an input start forbidden area on said thin film adjacent to said pressing face, and does not generate said direction input signal when the detected operating position is inside said input start forbidden area.

6. A cellular phone comprising:
a display screen for displaying image information;
an operation key having a pressing face;
an electrostatic pad being provided between said display screen and said operation key, including a thin film arranged with a plurality of electrodes, and detecting an operating position of a user on said thin film on a basis of variations of electrostatic capacitances of said electrodes;
direction input control means sensing movement of said detected operating position on a basis of a result of the detection by said electrostatic pad, and generating a direction input signal indicating a direction of the movement;
key input means detecting a pressing operation of the user on said pressing face, and generating a key input signal; and
display control means displaying said image information in said display screen on a basis of said direction input signal, wherein
a part of said thin film of said electrostatic pad is formed with overlapping with at least a part of said pressing face of said operation key, and
said direction input control means generates said direction input signal when the detected operating position upon start of the movement is outside an input start forbidden area formed on said thin film in relation to said pressing face, and does not generate said direction input signal when the detected operating position is inside said input start forbidden area.

* * * * *